(12) United States Patent
Owen et al.

(10) Patent No.: US 6,665,742 B2
(45) Date of Patent: Dec. 16, 2003

(54) SYSTEM FOR RECONFIGURING A FIRST DEVICE AND/OR A SECOND DEVICE TO USE A MAXIMUM COMPATIBLE COMMUNICATION PARAMETERS BASED ON TRANSMITTING A COMMUNICATION TO THE FIRST AND SECOND DEVICES OF A POINT-TO-POINT LINK

(75) Inventors: Jonathan M. Owen, Northboro, MA (US); Mark D. Hummel, Franklin, MA (US); Derrick R. Meyer, Austin, TX (US)

(73) Assignees: Advanced Micro Devices, Inc., Sunnyvale, CA (US); API Networks, Inc., Concord, MA (US)

( * ) Notice: Subject to any disclaimer, the term of this patent is extended or adjusted under 35 U.S.C. 154(b) by 449 days.

(21) Appl. No.: 09/773,777

(22) Filed: Jan. 31, 2001

(65) Prior Publication Data

US 2002/0103945 A1 Aug. 1, 2002

(51) Int. Cl.[7] ............................................... G06F 13/10
(52) U.S. Cl. ................................. 710/10; 710/3; 710/8; 710/9; 710/104; 713/1; 713/100
(58) Field of Search ............................. 710/3, 4, 8–10, 710/104, 305–307, 311, 312; 709/220–222, 227–229; 713/1, 2, 100; 370/257, 258, 395.2, 395.21, 453, 457

(56) References Cited

U.S. PATENT DOCUMENTS 5,701,514 A * 12/1997 Keener et al. ................ 710/14
5,805,924 A * 9/1998 Stoevhase .................... 710/11
5,983,261 A * 11/1999 Riddle ......................... 709/204
6,212,169 B1 * 4/2001 Bawa et al. .................. 370/232
6,359,863 B1 * 3/2002 Varma et al. ................ 370/232
6,442,628 B1 * 8/2002 Bastiani et al. .............. 710/60
6,539,450 B1 * 3/2003 James et al. ................. 710/306

* cited by examiner

Primary Examiner—Ilwoo Park
(74) Attorney, Agent, or Firm—Meyertons Hood Kivlin Kowert & Goetzel, P.C.; B. Noël Kivlin

(57) ABSTRACT

A method for initializing a computing system comprising a plurality of devices which communicate on a communication link comprising a plurality of independent point-to-point links is provided, each of the point-to-point links interconnecting a respective pair of the plurality of devices. The method includes a link initialization procedure comprising initially configuring each respective pair of devices to communicate on the respective interconnecting link using common communication parameters, including a common frequency and a common link width. The link initialization procedure also may include an optimization procedure for determining maximum communication parameters for each interconnected pair of devices. If the maximum compatible parameters differ from the common parameters for any pair of devices, then the pair of devices may be reconfigured to communicate on the interconnecting link using the maximum compatible parameters. Once a communication capability has been established, the establishment of one or more communication fabrics for the computer system may be performed.

38 Claims, 8 Drawing Sheets

90

| 31 | 24 23 | 16 15 | 8 7 | 0 |
|---|---|---|---|---|
| Command | | Capabilities Pointer | Capability ID | |
| Link Config 0 | | Link Control 0 | | |
| Link Config 1 | | Link Control 1 | | |
| | | Link Freq 1 | Link Freq 0 | |

| 15 | 12 | 11 | 8 | 7 | 6 | 5 | 4 | 3 | 2 | 1 | 0 |
|---|---|---|---|---|---|---|---|---|---|---|---|
| | | CRC Error | | Trans Off | End of Chain | Init. Compl. | Link Fail | CRC Force Error | CRC Start Test | CRC Fixed Enable | |

| 31 | 30 | 28 | 27 | 26 | 24 | 23 | 22 | 20 | 19 | 18 | 16 |
|---|---|---|---|---|---|---|---|---|---|---|---|
| | LinkWidthOut | | | LinkWidthIn | | | MaxLinkWidthOut | | | MaxLinkWidthIn | |

*FIG. 8*

SYSTEM FOR RECONFIGURING A FIRST DEVICE AND/OR A SECOND DEVICE TO USE A MAXIMUM COMPATIBLE COMMUNICATION PARAMETERS BASED ON TRANSMITTING A COMMUNICATION TO THE FIRST AND SECOND DEVICES OF A POINT-TO-POINT LINK

BACKGROUND OF THE INVENTION

1. Field of the Invention

The present invention relates generally to the initialization of a computing system including a plurality of interconnected devices. More particularly, the present invention relates to initializing a computing system having a bi-directional communication link comprising a plurality of independent sets of unidirectional point-to-point links interconnecting the plurality of devices, the initialization establishing an integrated communication fabric.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many computer systems have been designed around a shared bus architecture that generally includes a processing subsystem having one or more processing devices and a system memory connected to a shared bus. Transactions between processing devices and accesses to memory occur on the shared bus, and all devices connected to the bus are aware of any transaction occurring on the bus. In addition to a processing subsystem, many computer systems typically include an input/output (I/O) subsystem coupled to the shared bus via an I/O bridge that manages information transfer between the I/O subsystem and the processing subsystem. Many I/O subsystems also generally follow a shared bus architecture, in which a plurality of I/O or peripheral devices are coupled to a shared I/O bus. The I/O subsystem may include several branches of shared I/O buses interconnected via additional I/O bridges.

Such shared bus architectures have several advantages. For example, because the bus is shared, each of the devices coupled to the shared bus is aware of all transactions occurring on the bus. Thus, transaction ordering and memory coherency is easily managed. Further, arbitration among devices requesting access to the shared bus can be simply managed by a central arbiter coupled to the bus. For example, the central arbiter may implement an allocation algorithm to ensure that each device is fairly allocated bus bandwidth according to a predetermined priority scheme.

Shared buses, however, also have several disadvantages. For example, the multiple attach points of the devices coupled to the shared bus produce signal reflections at high signal frequencies which reduce signal integrity. As a result, signal frequencies on the bus are generally kept relatively low to maintain signal integrity at an acceptable level. The relatively low signal frequencies reduce signal bandwidth, limiting the performance of devices attached to the bus. Further, the multiple devices attached to the shared bus present a relatively large electrical capacitance to devices driving signals on the bus, thus limiting the speed of the bus.

The speed of the bus also is limited by the length of the bus, the amount of branching on the bus, and the need to allow turnaround cycles on the bus. Accordingly, attaining very high bus speeds (e.g., 500 MHz and higher) is difficult in more complex shared bus systems.

The problems associated with the speed performance of a shared bus system may be addressed by implementing the bus as a bi-directional communication link comprising a plurality of independent sets of unidirectional point-to-point links. Each set of unidirectional links interconnects two devices, and each device may implement one or more sets of point-to-point links. Thus, multiple devices can be connected in a variety of configurations, such as a daisy chain, a ring, a ring connected to a daisy chain, interconnected daisy chains, interconnected rings, etc.

In systems having a communication link implemented as a plurality of independent sets of point-to-point links, initialization of the system to yield an integrated "fabric" of interconnected devices that can communicate with each other can be more complex than the initialization of a system in which devices communicate on a shared bus. For example, in shared bus systems, the devices generally all communicate at the same frequency using the same transmitter/receiver widths. The common frequency and widths may be determined by examining the shared bus. Further, because all of the devices are connected to the shared bus, the locations of all of the devices are known and can be reached during the initialization procedure.

In a point-to-point link system, however, the system's devices are not connected to a common bus, and thus cannot determine common communication parameters (e.g., clock frequency, transmitter and receiver widths, etc.) simply by looking at a single bus. Indeed, devices in point-to-point link systems are unaware of the parameters and the locations of other devices which are not directly connected to that particular device. Thus, it would be desirable to provide an initialization scheme for point-to-point link systems that includes a low-level initialization of each link that enables the devices at the ends of each link to communicate in a compatible manner. Then, initialization at a system level to establish an integrated fabric may proceed, including definition of routing directions and optimization of transmitter and receiver frequencies and widths.

Because point-to-point link systems may be configured in a variety of structures, it would be desirable to provide an initialization scheme at the system level that results in the determination and definition of the physical and logical structure of the computing system, including the identification of the location of each device in the system. For example, in point-to-point link systems having a ring structure, a communication between two devices may take several different routes through a variety of other devices before reaching its destination. Thus, such a system initialization procedure would establish the location of each device relative to the other device, provide each device with a unique identifier, and optimize routing paths for communications among the devices. The routing paths may then be placed in routing tables or maps for each device.

In point-to-point link systems having a daisy-chain structure, the devices in the chain often are subservient to a master device, such as a bridge device, connected to one end of the chain. In such systems, communication protocols may dictate that communications should be routed in a particular direction, such as towards the master device. Thus, it would be desirable to provide an initialization scheme for a system having a daisy-chain structure that provides each device with a unique identifier and determines the direction in which the master device is located such that communications may be routed in an appropriate manner.

In addition to routing, daisy-chain structures introduce other complexities that should be addressed by the initialization process. For example, because the devices in the chain are unaware of transactions occurring between other devices in the chain, a device sending a communication down the chain may not be aware of acceptance of the communication by another device. Accordingly, it would be desirable to provide an initialization scheme that results in the definition of the physical and/or logical end of the chain, such that an error message may be generated by the device at the end of the chain if a communication is not accepted by any device on the chain.

Still further, even though the low-level initialization of the links establishes default compatible communication frequencies and widths, communications among device may occur more efficiently by allowing the transmitters and receivers of the devices at the ends of each point-to-point link to communicate using the maximum compatible communication frequencies and width for the respective transmitter/receiver pairs. Thus, it would be desirable to provide an initialization scheme that determines the maximum compatible communication parameters of the transmitter/receiver pair at the ends of each unidirectional link and configures each transmitter/receiver pair to communicate using the maximum compatible communication parameters.

Thus, such an initialization scheme for a system having a plurality of independent point-to-point links would result in an integrated fabric of interconnected devices. The initialization scheme would include a low-level initialization of each link, such that the devices on either side of the link can communicate in a compatible manner. The initialization scheme would also include a system-level initialization that results in the definition of the structure of the fabric, including the location and identification of each device in the system, the definition of routing directions for communications among devices, and optimized transmit and receive frequencies and widths for the transmitter/receiver pairs connected to each point-to-point link.

The present invention may be directed to one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method of initializing a computing system having a plurality of devices interconnected by a plurality of point-to-point links. The method comprises configuring a first device and a second device interconnected by a first point-to-point link to communicate on the first point-to-point link using common communication parameters. The method further comprises transmitting a communication to the first device and the second device, and determining, based on the communication, maximum compatible communication parameters of the first and second devices for communications on the first point-to-point link. If the maximum compatible communication parameters differ from the common communication parameters, the devices at each end of the point-to-point link are reconfigured to communicate on the link using the maximum compatible communication parameters.

BRIEF DESCRIPTION OF THE DRAWINGS

The foregoing and other advantages of the invention will become apparent upon reading the following detailed description and upon reference to the drawings in which:

FIG. 6 illustrates an exemplary embodiment of a capability block specifying the capabilities of the device of FIG. 5, in accordance with the invention;

FIG. 7 illustrates an exemplary embodiment of a control register of the capability block of FIG. 6;

FIG. 8 illustrates an exemplary embodiment of a configuration register of the capability block of FIG. 6;

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figures 1, 2:
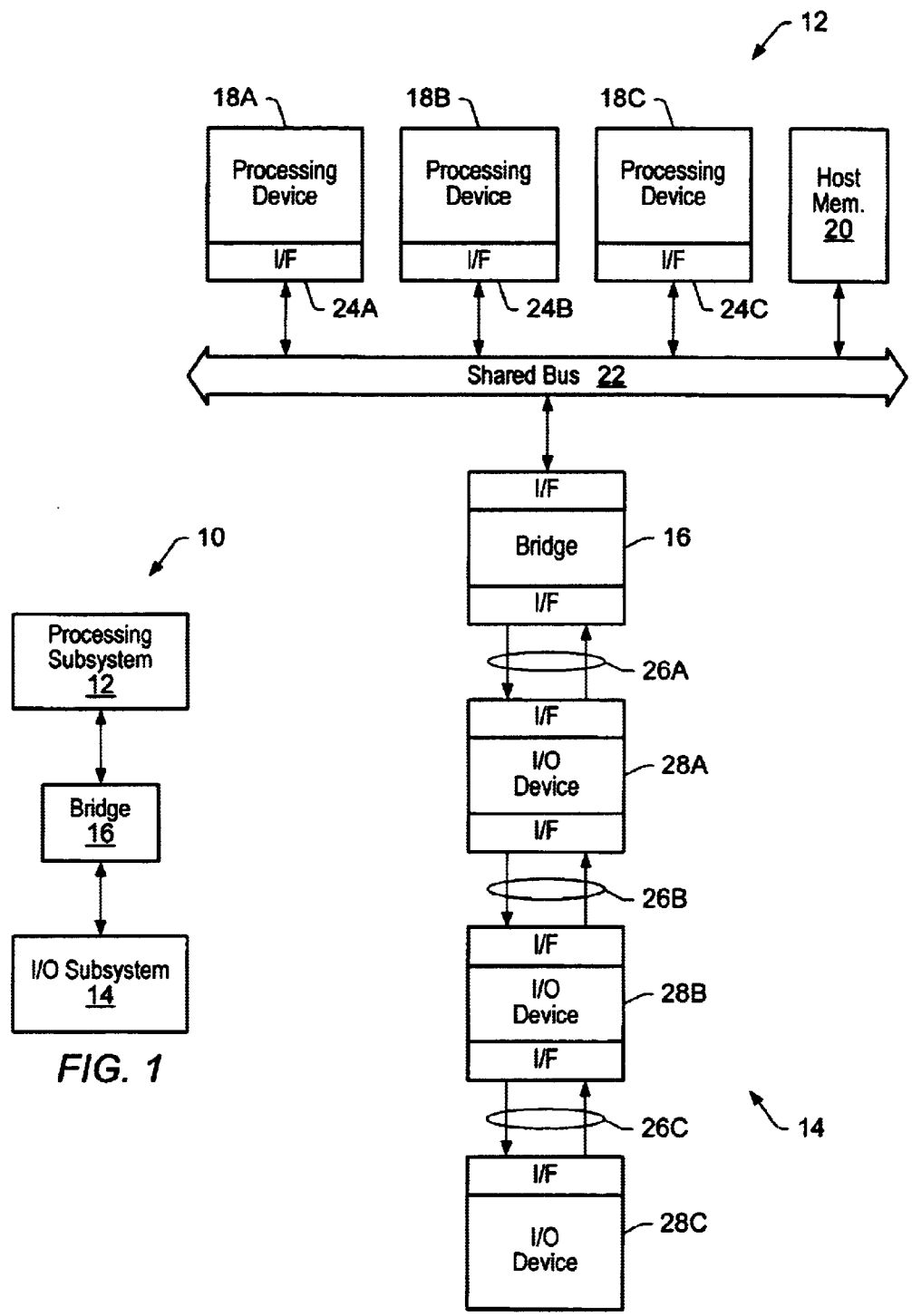
FIG. 1 is a block diagram of an exemplary computing system, including a processing subsystem interconnected to an I/O subsystem via a bridge device.
FIG. 2 illustrates an exemplary embodiment of the computing system of FIG. 1, in which the processing subsystem has a shared bus, while the I/O subsystem implements a plurality of point-to-point communication links in accordance with the invention.

Turning now to the drawings, and with reference to FIG. 1, a computing system 10 is shown including a processing subsystem 12 and an input/output (I/O) subsystem 14. The processing subsystem 12 is connected to the I/O subsystem 14 via a bridge device 16 (e.g., a host bridge) which manages communications and interactions between the processing subsystem 12 and the I/O subsystem 14.

Figure 3:
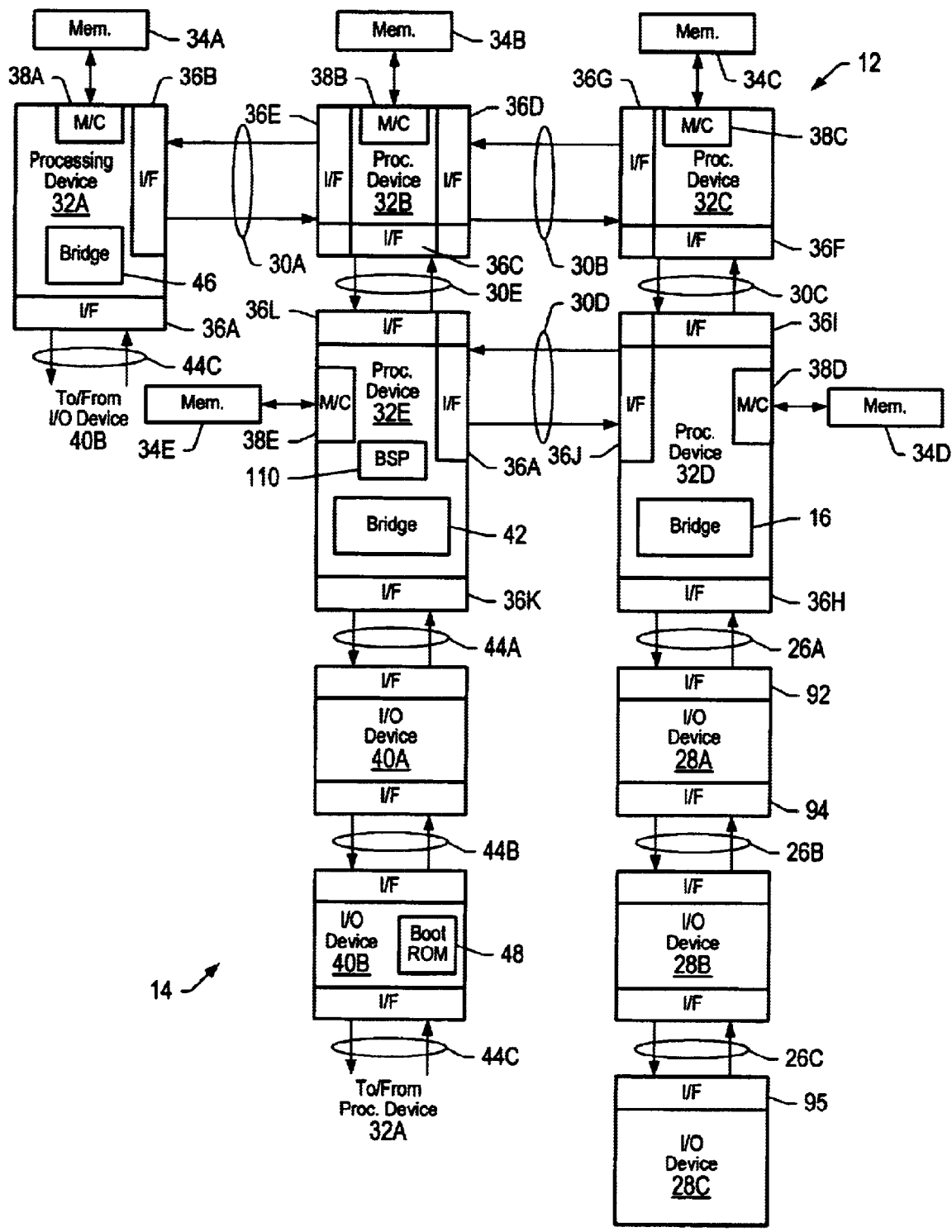
FIG. 3 illustrates another exemplary embodiment of the computing system of FIG. 1, in which both the processing subsystem and the I/O subsystem implement point-to-point communication links in accordance with the invention.

With reference to FIGS. 2 and 3, the processing subsystem 12 may include one or more processing devices. In the system illustrated in FIG. 2, the processing subsystem 12 has an architecture in which the processing devices 18A, 18B, and 18C and a host memory 20 are connected to a shared bus 22. Communications between the processing devices 18A, 18B, and 18C and accesses to the host memory 20 occur on the shared bus 22. Each processing device 18A, 18B, and 18C generally includes a processor, (e.g., a microprocessor, microcontroller, etc.) configured to execute software code in accordance with an instruction set (e.g., the x86 instruction set, the ALPHA instruction set, the POWERPC instruction set, etc.). Each processing device 18A, 18B, and 18C also includes an interface (I/F) 24A, 24B, and 24C, respectively, to control the transfer of communications to and from the shared bus 22. The bridge device 16 also is connected to the shared bus 22 and manages communications between the processing subsystem 12 and the I/O subsystem 14.

In the embodiment illustrated in FIG. 2, the bus in the I/O subsystem 14 is implemented as a bi-directional communication link 26 having a plurality of independent sets of unidirectional point-to-point links 26A, 26B, and 26C. As shown in FIG. 2, the I/O subsystem 14 includes a plurality of I/O devices 28A, 28B, and 28C interconnected by the sets of unidirectional links 26A, 26B, and 26C in a daisy-chain structure. It should be understood, however, that the particular structure of the I/O subsystem 14 may vary.

Each I/O device 28A, 28B, and 28C generally embodies one or more logical I/O functions (e.g., modem, sound card, etc.). Further, one of the I/O devices may be designated as a default device, which may contain, among other items, the boot read-only memory (ROM) having the initialization code for initializing the computing system 10. Although only three physical I/O devices are illustrated in FIG. 2, it should be understood that more or fewer I/O devices may be interconnected in the daisy chain. Further, the computing system 10 may support multiple chains of I/O devices depending on the particular application for which the computing system 10 is designed.

Another embodiment of the computing system 10 is illustrated in FIG. 3 in which processing subsystem 12 is implemented as a distributed multiprocessing subsystem. In this structure, the shared bus 22 is replaced with a bi-directional communication link comprising a plurality of independent point-to-point bi-directional communication links 30A, 30B, 30C, 30D, and 30E interconnecting a plurality of processing devices 32A, 32B, 32C, 32D, and 32E. The particular structure of the distributed processing subsystem 12 can vary based on the particular application for which the computing system 10 is intended. For example, as shown in FIG. 3, the processing devices 32B, 32C, 32D, and 32E are arranged in a ring structure, and the processing device 32A is a branch extending from the ring. Other types of structures are contemplated, such as interconnected rings, daisy chains, etc.

In the distributed processing subsystem 12 illustrated in FIG. 3, the system memory is mapped across a plurality of memories 34A, 34B, 34C, 34D, and 34E, each of which is associated with a particular processing device 32A–E. The memories 34A–E may include any suitable memory devices, such as one or more RAMBUS DRAMs, synchronous DRAMs, static RAM, etc. As with the shared bus system illustrated in FIG. 2, each processing device 32A–E includes a processor (not shown) configured to execute software code in accordance with a predefined instruction set. However, in contrast to the devices in the shared bus system, the processing devices 32A–E in the distributed processing subsystem 12 implement one or more bi-directional point-to-point links and, thus, include one or more interfaces (I/F) 36A–M to manage the transmission of communications to and from each bi-directional point-to-point link; connected to that processing device. As illustrated in FIG. 3, the interfaces 36A, 36H, and 36K manage communications between the I/O subsystem 14 and the processing subsystem 12, while the interfaces 36B–G, 36I–J, and 36L–M interface to other processing devices 32 in the processing subsystem 12.

The processing devices 32A–E further include memory controllers (M/C) 38A–E, respectively, for controlling accesses to the portion of memory associated with that processing device. Each processing device may also include a bridge device, such as host bridges 16, 42, and 46, to couple the processing subsystem 12 to the I/O subsystem 14. Each processing device also may include packet processing logic (not shown) to process and route packets as appropriate. As would be realized by one of ordinary skill in the art, the particular configurations and constituent components of each processing device may vary depending on the application for which the computing system 10 is designed.

The I/O subsystem 14 illustrated in FIG. 3 includes two daisy chains of I/O devices. The first daisy chain is a single-ended chain that includes the I/O devices 28A, 28B, and 28C. interconnected by bi-directional links 26B and 26C. The bridge device 16 of the processing device 32D connects the I/O devices 28A, 28B, and 28C to the processing subsystem 12 via the bi-directional link 26A. The second daisy chain is a double-ended chain that includes the I/O devices 40A and 40B interconnected by the bi-directional link 44B. The bridge device 42 of the processing device 32E connects one end of the chain to the processing subsystem 12 via the bi-directional link 44A, and the bridge device 46 of the processing device 32A connects the other end of the chain to processing subsystem 12 via the bi-directional link 44C. Although the bridges 16, 42, and 46 are illustrated as devices integrated in the processing devices, in other embodiments, the bridges may be stand-alone devices or integrated in other devices in the processing subsystem 12.

The I/O devices 40A and 40B are similar to the I/O devices 28A, 28B, and 28C and, thus, may embody one or more I/O functions. Alternatively, as discussed above, one of the I/O devices may be designated as the default device which contains the boot ROM. In the embodiment illustrated in FIG. 3, the I/O device 40B is the default device which contains the boot ROM 48.

Each I/O device in the I/O subsystem 14 may have interfaces to one or more bi-directional point-to-point links. For example, the I/O device 28A includes a first interface 92 to the bi-directional point-to-point link 26A and a second interface 94 to the bi-directional point-to-point link 26B. The I/O device 28C, on the other hand, is a single-link device having only a first interface 95 to the link 26C.

In embodiments which implement a chain terminated at both ends by a host bridge (e.g., bridges 42 and 46), any appropriate technique may be implemented to designate which bridge device (e.g., bridge device 42) is the master bridge and which bridge device (e.g., bridge device 46) is the slave bridge. In the exemplary embodiment, the master bridge provides the default path for communications between the processing subsystem 12 and the I/O subsystem 14, including the path for initializing the I/O devices on the chain connected to master bridge. The slave bridge provides an alternate, or backup, path for communications between the processing subsystem 12 and the I/O subsystem 14, and also may provide the path to initialize any devices in the chain that could not be reached through the master bridge due to a failure, for example. This type of double-ended configuration can be useful to ensure continued communication with the processing subsystem 12 and to ensure that all I/O devices in a chain are initialized in the event one of the bridges, I/O devices, or point-to-point links fails. In some embodiments, during the initialization process, the I/O devices 40A and 40B in the double-ended daisy chain may be apportioned between the two bridge devices 42 and 46 to balance communication traffic even in the absence of a link failure.

Figure 4:
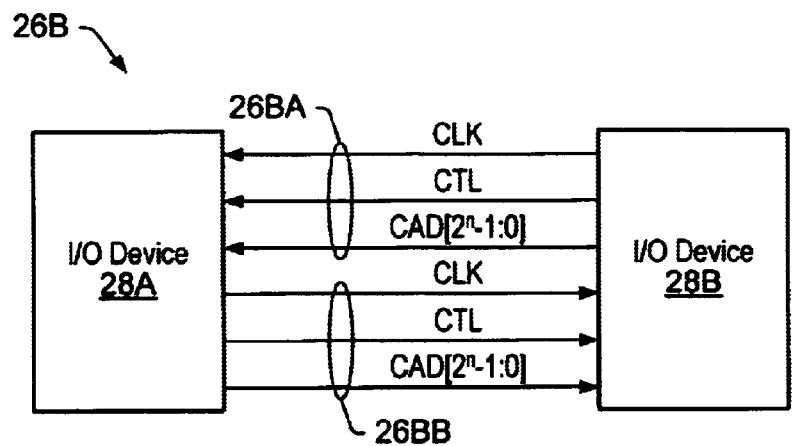
FIG. 4 illustrates an exemplary embodiment of a point-to-point link implemented in the systems of FIGS. 2 and 3.

In an exemplary embodiment, each bi-directional point-to-point communication link 26A–C, 30A–E, and 44A–C is a packet-based link and may include two unidirectional sets of links or transmission media (e.g., wires). FIG. 4 illustrates an exemplary embodiment of the bi-directional communication link 26B which interconnects the I/O devices 28A and 28B. The other bi-directional point-to-point links in computing system 10 may be configured similarly. In FIG. 4, the bi-directional point-to-point communication link 26B includes a first set of three unidirectional transmission media 26BA directed from the I/O device 28B to the I/O device 28A, and a second set of three unidirectional transmission media 26BB directed from the I/O device 28A to the I/O device 28B. Both the first and second sets of transmission media 26BA and 26BB include separate transmission media for a clock (CLK) signal, a control (CTL) signal, and a command/address/data (CAD) signal.

In one embodiment, the CLK signal serves as a clock signal for the CTL and CAD signals. A separate CLK signal may be provided for each byte of the CAD signal. The CAD signal is used to convey control information and data. The CAD signal may be $2^n$ bits wide, and thus may include $2^n$ separate transmission media.

The CTL signal is asserted when the CAD signal conveys a bit time of control information, and is deasserted when the CAD signal conveys a bit time of data. The CTL and CAD signals may transmit different information on the rising and falling edges of the CLK signal. Accordingly, two bit times may be transmitted in each period of the CLK signal.

Because the devices in processing subsystem 12 and I/O subsystem 14 are connected to a bi-directional communication link that is implemented as a plurality of independent sets of unidirectional point-to-point links, an initialization procedure performed at system startup or reset integrates the independent point-to-point links and the devices connected thereto into a complete "fabric." Thus, in the computing system 10 illustrated in FIG. 3, initialization results in establishing a first communication fabric for the processing subsystem 12 and a second communication fabric for the I/O subsystem 14.

A packet routed within the fabrics of the processing subsystem 12 and the I/O subsystem 14 may pass through one or more intermediate devices before reaching its destination. For example, a packet transmitted by the processing device 32B to the processing device 32D within the fabric of the processing subsystem 12 may be routed through either the processing device 32C or the processing device 32E. Because a packet may be transmitted to its destination by several different paths, packet routing tables in each processing device provide optimized paths. The packet routing tables are defined during the initialization of the processing subsystem fabric, as will be discussed below. Further, because the processing devices are not connected to a common bus and because a packet may take many different routes to reach its destination, transaction ordering and memory coherency issues are addressed. In an exemplary embodiment, communication protocols and packet processing logic in each processing device are configured as appropriate to maintain proper ordering of transactions and memory coherency within the processing subsystem 12.

Packets transmitted between the processing subsystem 12 and the I/O subsystem 14 pass through the bridge device 16, the bridge device 42, or the bridge device 46. Because the I/O devices in the I/O subsystem 14 are connected in a daisy-chain structure, a transaction that occurs between two I/O devices is not apparent to other I/O devices which are not positioned in the chain between the I/O devices participating in the transaction. Thus, as in the processing subsystem 12, ordering of transactions cannot be agreed upon by the I/O devices in a chain. In an exemplary embodiment, to maintain control of ordering, direct peer-to-peer communications are not permitted, and all packets are routed through the bridge device 16, 42, or 46 at one end of the daisy chain. The bridge devices 16, 42, and 46 may include appropriate packet processing and translation logic to implement packet handling, routing, and ordering schemes to receive, translate, and direct packets to their destinations while maintaining proper ordering of transactions within I/O subsystem 14 and processing subsystem 12. Further, each I/O device may include appropriate packet processing logic to implement routing and ordering schemes, as desired.

In an exemplary embodiment, packets transmitted within the fabric of the I/O subsystem 14 travel in I/O streams, which are groupings of traffic that can be treated independently by the fabric. Because ordering of packets in the exemplary embodiment is implemented by prohibiting direct peer-to-peer communications, all packets travel either to or from a bridge device 16, 42, or 46. Packets which are transmitted in a direction toward a bridge device are travelling "upstream." Similarly, packets which are transmitted in a direction away from the bridge device are travelling "downstream." Thus, for example, a request packet transmitted by the I/O device 28C (i.e., the requesting device) to the I/O device 28A (i.e., the target device), travels upstream through I/O device 28B, through the I/O device 28A, to the bridge device 16, and back downstream to the I/O device 28A where it is accepted. This packet routing scheme thus indirectly supports peer-to-peer communication by having a requesting device issue a request packet to the bridge device 16, and having the bridge device 16 manage packet interactions and issue a corresponding packet back downstream to the target device. To implement such a routing scheme, initialization of the I/O fabric includes configuring each I/O device such that it can identify its "upstream" and "downstream" directions.

In embodiments which include a double-hosted chain, each I/O device is configured to transmit requests to one or the other of the host bridges. Thus, different devices in the same chain may have different definitions of the "upstream" and "downstream" directions.

To identify the source and destination of packets, each device in the processing subsystem 12 and the I/O subsystem 14 is assigned one or more unique identifiers during the initialization of the computing system. In an exemplary embodiment of the I/O subsystem 14, the unique identifier is referred to as a "unit ID." A particular I/O device may have multiple unit IDs if, for example, the device embodies multiple devices or functions which are logically separate. Accordingly, an I/O device on any chain may generate and accept packets associated with different unit IDs. In an exemplary embodiment, communication packets include a unit ID field having five bits. Thus, thirty-two unit IDs are available for assignment to the I/O devices connected in each daisy chain in the I/O subsystem 14.

In an exemplary embodiment of the I/O subsystem 14, the I/O devices are configured to place in request packets the unit ID of the device, or unit within the device, that is issuing the request. In one embodiment, a unit ID of "0" is reserved for bridges at the ends of the chain. Thus, any request packet carrying the value of "0" in the unit ID field is known to be traveling in the downstream direction on the chain. In accordance with the routing protocol in the exemplary embodiment, downstream requests are routed by address. That is, each I/O device on the chain is configured to accept any having an address with a particular assigned address range or ranges. Thus, when a downstream request is received, the I/O device compares the packet's address with the assigned address range or ranges. If the packet's address falls within an assigned range, the I/O device accepts the packet. Otherwise, the I/O device forwards the packet to the next downstream I/O device on the chain. The routing protocol further dictates that all upstream request packets are forwarded by the I/O devices until they reach the bridge at the end of the chain.

When the system is reset (i.e., before initialization has occurred or is complete), all address ranges are disabled, except for a configuration address range. In an exemplary embodiment, the configuration address range is based on the base Unit ID of the corresponding I/O device. Thus, during initialization, I/O devices may be accessed by addressing the packets in a manner that corresponds to the devices' base Unit IDs.

Routing of response packets is handled in a different manner in the exemplary embodiment. Each response packet in the I/O subsystem 14 includes a bit that indicates whether the response is traveling in the downstream or upstream direction. The I/O devices are configured to accept a downstream response if the response packet's unit ID matches a unit ID assigned to that I/O device. Upstream responses are forwarded by the I/O devices until they reach the bridge at the end of the chain.

As with the I/O devices in the I/O subsystem 14, each processing device 32A–E in the processing subsystem 12 is assigned a unique identifier during the initialization of the computing system 10. In an exemplary embodiment of the processing subsystem 12, the unique identifier is referred to as a "node ID" and identifies the particular processing device which initiated a transaction. The node ID is carried in a three-bit field in packets which are transmitted on the processing subsystem's fabric, and thus a total of eight processing devices may be interconnected in the processing subsystem 12. Alternative embodiments may provide for the identification of more or fewer processing devices.

Each processing device 32A–E in the processing subsystem 12 also may have one or more units (e.g., a processor, a memory controller, a bridge, etc.) that may be the source of a particular transaction. Thus, unique identifiers also may be used to identify each unit within a particular processing device. These unique identifiers are referred to as "unit IDs" and are assigned to each unit in a processing device during initialization of the processing subsystem's fabric. In the exemplary embodiment, the unit ID is carried in a two-bit field in packets transmitted within the processing subsystem, and thus a total of four units may be embodied within a particular processing device.

In an exemplary embodiment of the processing subsystem 12, packet routing is performed based on the packet's node ID and unit ID. That is, each processing device 32 is responsible for determining the destination node ID and unit ID for each packet generated by that device and placing the information into the packet. Each device in the processing subsystem 12 includes a routing map or table which provides routing directions for packets received from either internal packet generating logic or other processing devices. For example, the routing directions may be indexed by node ID, such that an appropriate path may be selected by reading the node ID in the received packet and referring to the routing table for that node ID. The entry in the routing table may indicate either a particular outgoing point-to-point link on which to route the packet or that the packet should be routed internally (i.e., a "self" entry). For "self" entries, logic within the device appropriately routes the packets to the internal destination which corresponds to the packet's unit ID. In one embodiment, different routing tables may be provided for response packets and request packets, such that different types of packets may follow different paths to a particular destination.

In certain embodiments, the processing subsystem 12 also may support broadcast packets which are transmitted to all devices in the processing subsystem 12 rather than to a single destination. Thus, each processing device 32 may be configured to include a separate broadcast routing table which is indexed by the node ID of the device which sourced the broadcast packet. In one embodiment, each entry in the broadcast routing table includes a bit for each link implemented by the device. The state of the bits in the entry indicates whether the broadcast packet is to be routed out on the corresponding links.

Figure 5:
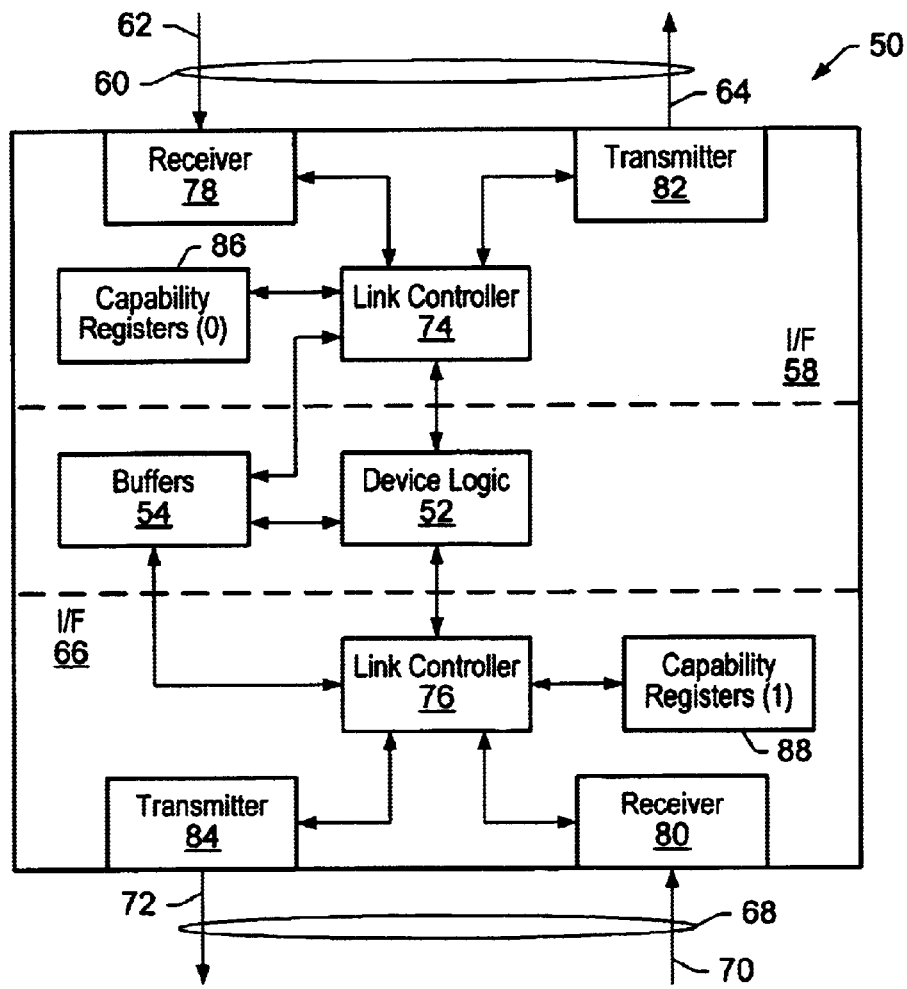
FIG. 5 illustrates an exemplary embodiment of a device used in the computing systems of FIGS. 2 and 3.

Turning now to FIG. 5, an exemplary embodiment of a device 50 (e.g., a processing device, an I/O device, etc.) that may be connected to a bi-directional point-to-point link is illustrated. Device 50 is illustrated as implementing two bi-directional links 60 and 68. However, it is contemplated that device 50 may implement only a single link or more than two links. Further, it should be understood that the device 50 may embody components or functions that are different than or in addition to those illustrated in FIG. 5. For example, if the device 50 is a processing device 32, it may further include a processor, a memory cache, a memory controller, a host bridge, etc. Further, the device logic may be configured differently based on the type of device and the particular application in which the device is being used. For example, the device logic may include appropriate packet processing logic, as well as routing tables or maps which define paths for the packets when travelling to a particular destination.

With reference to FIG. 5, the device 50 includes device logic 52 and buffer 54. The device logic 52 is configured to process and manage (e.g., decode, route, etc.) packets in a manner appropriate for the particular type of device and the application in which the device is employed. The buffer 54 is configured to store packets when they are received or generated by the device, and to release the packets upon completion of processing or when transmitted onto one of the point-to-point communication links.

The device 50 further includes a first interface 58 connected to a first bi-directional point-to-point communication link 60 having a unidirectional receiving link 62 and a unidirectional transmitting link 64. The device 50 further includes a second interface 66 connected to a second bi-directional point-to-point communication link 68 having a unidirectional receiving link 70 and a unidirectional transmitting link 72. The first and second interfaces 58 and 66 generally are similar to the interfaces (I/F) of the processing devices and the I/O devices, illustrated in FIGS. 2 and 3, which are connected to a bi-directional point-to-point link. Although the interfaces 58 and 66 are shown separate from the buffer 54 and the device logic 52 in FIG. 5, it should be understood that the buffer 54 and/or the device logic 52 may be incorporated in, or apportioned between, the interfaces 58 and 66.

The first and second interfaces 58 and 66 include a link controller 74 and 76, a receiver 78 and 80, a transmitter 82 and 84, and capability registers 86 and 88, respectively. Each receiver 78 and 80 and transmitter 82 and 84 has a rated receive and transmit clock frequency, respectively, as well as a maximum receive and transmit link width, respectively. For example, each receiver 78 and 80 and transmitter 82 and 84 may be capable of receiving and transmitting at a minimum frequency of 200 MHz, but may be rated (i.e., have the capability) to receive and transmit packets up to a maximum frequency (e.g., 200 MHz, 400 MHz, 500 MHz, 600 MHz, 800 MHz, 1 GHz, etc.). Further, each receiver 78 and 80 and transmitter 82 and 84 may be capable of implementing a minimum link width of 2 bits, but may have the physical capability to implement a maximum link width of up to $2^n$ (e.g., 4, 8, 16, 32, 64, etc.) bits.

Each link controller 74 and 76 implements flow control and management schemes for receiving and transmitting packets from and onto the receiving and transmitting links. The capability registers 86 and 88 generally specify the communication capabilities (e.g., frequency, width, etc.) of each unidirectional link of the bi-directional links 60 and 68, respectively. In an exemplary embodiment, the link controllers 74 and 76 and the capability registers 86 and 88 are used to configure the interfaces 58 and 66 of the device 50 during a low-level initialization of each unidirectional point-to-point link which is part of the fabric.

In an exemplary embodiment, the capability registers 86 and 88 are included in a capabilities block 90, which is defined for each device. The particular format of the capability block 90 and the types and number of fields or registers in the block may vary depending on the particular device and the application in which the device is being used. FIG. 6 illustrates an exemplary embodiment of a capabilities block 90 for the device 50 of FIG. 5. The capabilities block 90 for device 50 includes registers which correspond to each of the two interfaces 58 and 66 which the device 50 implements. A device having only one interface to a point-to-point link may have a capability block having a lesser number of registers than the block 90 shown in FIG. 6. Similarly, a device having more than two interfaces to point-to-point links may have a capability block having a greater number of registers than the block 90. In general, the capability block for any particular device includes a set of capability registers for each interface to a point-to-point link.

The capability block 90 illustrated in FIG. 6 includes a Capability ID register, a Capabilities Pointer register, and a Command register. The Capability ID register and the Capabilities Pointer register are read-only registers that identify general capabilities of the device's interfaces. For example, the Capability ID register may identify the type of communication link with which the device interface is compatible, while the Capabilities Pointer register may carry a pointer to the next device capability in a list of capabilities, if any.

The Command register in the capabilities block 90 includes a plurality of bits which are used to configure the corresponding interface of the device. For example, the Command register may include a Capability Type field which identifies whether the capability block corresponds to one interface or to multiple interfaces. Thus, the format and content of the remainder of the capability block 90, as well as the format of the remaining bits in the Command register, are based on the contents of the Capability Type field.

For example, in one embodiment, the Command register of the capability block 90 for the interfaces 92 and 94 of the I/O device 28A in FIG. 3 may include a Base Unit ID field, a Unit Count field, a Master Host bit, and a Default Direction bit. The Base Unit ID field contains the lowest unit ID number assigned to the device. If multiple unit IDs are assigned to the device, the additional unit IDs occupy the next consecutive ID values above the base value. The Unit Count field is a read-only field that contains the number of IDs that should be assigned to the device.

The Master Host bit indicates which link implemented by the device is the path to the master (or only) bridge device (e.g., bridge device 16 or bridge device 42) on a chain of devices. During initialization, the Master Host bit is automatically set to point to the link from which the Command register was last written. The Default Direction bit indicates whether request packets generated by the device should be transmitted in the direction indicated by the Master Host bit (i.e., towards the bridge device), or in the other direction. For example, in the system illustrated in FIG. 3, the Default Direction bit for the I/O device 28A may indicate that packets generated by the I/O device 28A should be transmitted upstream to the bridge device 16 (i.e., the Master Host for the chain) on the transmitting line of link 26A.

In an exemplary embodiment, the Command register of the capability block 90 for the interface 96 of the bridge device 16 may include a Warm Reset bit and a Double Ended bit. The state of the Warm Reset bit indicates whether a reset sequence of the corresponding chain of devices should be warm or cold. The state of the Double Ended bit indicates whether another bridge device is present at the far end of the corresponding I/O chain. For example, the Double Ended bit in the command registers for bridge devices 42 and 46 are set to indicate that two bridge devices are present on the chain.

In the exemplary embodiment, the bits in the Command register are writeable by software, with the exception of the Unit Count field (which is read-only) and the Master Host bit (which is automatically set).

The capability block 90 illustrated in FIG. 6 also includes two copies of a Link Control Register (i.e., Link Control 0 and Link Control 1), one for each interface 58 and 66 to the bi-directional point-to-point links 60 and 68, respectively. An exemplary embodiment of a Link Control register 98 is illustrated in FIG. 7. It should be understood, however, that other embodiments are contemplated which may include different formats or different types and number of registers and bits.

Referring to FIG. 7, the Link Control register 98 includes a CRC Flood Enable bit to allow CRC errors on the corresponding bi-directional point-to-point link to cause a shutdown of the computing system; a CRC Start Test bit to initiate a CRC test sequence on the corresponding bi-directional point-to-point link; a CRC Force Error bit to generate CRC errors on the transmitting lines of the corresponding bi-directional point-to-point link; and a CRC Error field that indicates whether CRC errors have been detected on the receiving lines of the corresponding bi-directional link.

The Link Control register 98 also includes a Link Failure bit, an Initialization Complete bit, an End of Chain bit, and a Transmitter Off bit. The Link Failure bit indicates detection of a failure on the corresponding bi-directional link. The Initialization Complete bit indicates the completion of the low-level initialization of the corresponding bi-directional link, which will be described below. The state of this bit is indicative of whether a communication has been established with another device connected on the other end of the point-to-point link. The End of Chain bit indicates that the corresponding bi-directional link is not part of the logical chain, and therefore may be used to partition a chain or wall off a failing link or device. Thus, packets issued or forwarded to a link identified as the End of Chain either are dropped or result in an error message. Similarly, packets received from the End of Chain link are ignored by the device. The Transmitter Off bit may be used to shut off a link transmitter for power savings or reduction of electromagnetic interference.

The capability block 90 in FIG. 6 also includes two copies of a Link Configuration register (i.e., Link Control 0 and Link Control 1), one for each interface 58 and 66 to the bi-directional links 60 and 68. An exemplary embodiment of a Link Configuration register 100 is illustrated in FIG. 8. It should be understood, however, that other embodiments are contemplated which may include different formats or different types and number of registers and bits.

Each Link Configuration register 100 specifies parameters related to the corresponding link implemented by the device. For example, the Link Configuration register includes read-only data which specifies maximum capabilities of the corresponding link. In the embodiment illustrated in FIG. 8, the read-only data is included in a Max Link Width In (MaxLinkWidthIn) field and a Max Link Width Out (MaxLinkWidthOut) field. The Max Link Width In field and the Max Link Width Out field specify the maximum physical width of the corresponding receiving and transmitting links, respectively.

The Link Configuration register 100 also includes fields to which data may be written. This data specifies the utilized capabilities (as opposed to the maximum capabilities) of the corresponding link. The utilized capabilities are determined by a link initialization process which examines and compares the transmitter and receiver frequency and width capabilities on either side of each unidirectional link, as will be described below. The data describing the utilized capabilities is written, for example, to a Link Width In (LinkWidthIn) field which specifies the utilized width of the receiving link, and a Link Width Out (LinkWidthOut) field which specifies the utilized width of the transmitting link. The data written to the register 100 does not take effect until the link is subjected to a warm reset, which initializes the links at the new default values written to the register 100.

Returning to FIG. 6, the capability block 90 also includes two copies of a Link Frequency register (i.e., Link Freq 0 and Link Freq 1), one for each interface 58 and 66 to the bi-directional links 60 and 68. Each Link Frequency register specifies the maximum frequency at which the clock for the corresponding transmitter 82 and 84 may operate. Data representing the maximum operating frequency of the transmitter clock may be written to the register during the initialization process.

Figure 9:
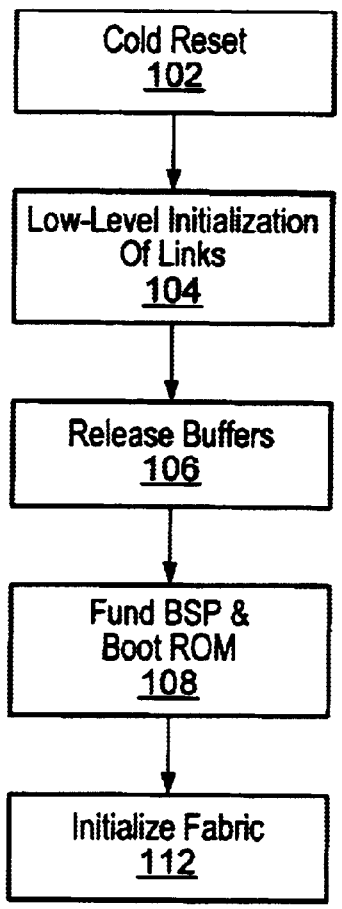
FIG. 9 is a flowchart illustrating an exemplary initialization scheme for the computing system of FIGS. 2 and 3, in accordance with the invention.

Turning now to FIG. 9, a flowchart illustrating an exemplary process for initializing a computing system 10 is illustrated. The process illustrated in FIG. 9 will be described with reference to the computing system 10 shown in FIG. 3, the device 50 illustrated in FIG. 5, and the capability block 90 shown in FIG. 6. It should be understood, however, that the initialization process represented in FIG. 9 applies to any system or subsystem which implements a communication link that comprises a plurality of independent sets of unidirectional point-to-point links, such as the computing system 10 illustrated in FIG. 2 in which only the I/O subsystem 14 implements point-to-point links. Moreover, the data specifying the capabilities of the device interfaces may be found in structures other than the capability block 90 of FIG. 6. It should be further understood that the particular order of the blocks shown in FIG. 9 is merely exemplary, and that other ordering of blocks, the inclusion of additional blocks, and the omission of certain blocks also is contemplated.

In the exemplary embodiment, initialization of the computing system 10 is triggered when the system is taken through a "cold" reset procedure which clears or resets appropriate device logic and capability registers in preparation for initialization (block 102). The cold reset sequence may be initiated upon application of power to the system or when triggered by an appropriate software routine or event, such as connection or disconnection of a device in the system 10. The initialization procedure also may include one or more "warm" resets, after which data written to certain persistent registers during the initialization procedure takes effect.

In response to either a cold or warm reset, a low-level (or link-level) initialization of each point-to-point link in the computing system 10 is performed (block 104). The low-level initialization of the links that follows cold and warm resets is substantially similar, with the exception that the default link communication parameters (e.g., link width and link frequency) are derived from different sources, as will be described below. In the exemplary embodiment, both the cold and warm low-level initialization includes a link synchronization procedure and a procedure by which each link is initialized, such that the devices at the ends of each link can communicate during initialization.

For a cold low-level initialization, the Link Freq registers in the capability block 90 are reset to a default value corresponding to the lowest common transmitter frequency that the transmitter/receiver pairs at either end of each uni-directional link should be capable of supporting. For example, the transmitter and receivers for each device connected to a point-to-point link in the computing system 10 may have a minimum rated operating frequency of 200 MHz. Thus, upon cold reset, the Link Freq registers are reset to a default value corresponding to 200 MHz such that all transmitters are initialized to a default frequency of 200 MHz in response to the cold reset. As will be described below, as part of the overall initialization of the system, the link frequencies may be optimized to maximum compatible values which take effect after a warm reset.

In addition to establishing a compatible communication frequency, the receivers and transmitters in the devices at the ends of each unidirectional link have minimum physical transmitter and receiver link widths. For example, all transmitters and receivers in the devices in the computing system 10 may support a link width of at least 8 bits. Thus, upon cold reset, the LinkWidthOut and LinkWidthIn fields of the Link Config register 100 of the capability block 90 are reset to a default value corresponding to an 8-bit link width such that the transmitters and receivers all are initialized to a default width of 8 bits in response to the cold reset.

In one embodiment, the cold reset sets the default link width in the capability block 90 for each device to 8 bits. However, it is possible that the computing system 10 may support devices having a narrower link width (e.g., 2 bits, 4 bits, etc). In such an embodiment, during the low-level link initialization that occurs after a cold reset, the link controller 74 of device 50 drives a high signal (e.g., a value of "1") onto the number of CAD lines on the transmitting link 64 that corresponds to the minimum of the widths of the transmitter 82 and the receiver 78. If the default link width is set to 8 bits, then the number of CAD lines used to carry the "1's," and the maximum bit width that may be represented, is eight.

The link controller on the other end of the link 64 determines the number of "1's" received on its incoming CAD lines, and sets the width of its transmitter and receiver accordingly (i.e., up to a maximum width of 8 bits). If the receiver on the other end of the link 64 is narrower than the width of the transmitter 82 (or the receiver 78, if the receiver 78 is narrower than the transmitter 82), then the number of 1's that will be counted corresponds to the width of that receiver at the end of the link 64. Accordingly, the counted number of "1's" corresponds to the minimum width of the receiver of the receiving device, the transmitter 82 of the transmitting device 50, and the receiver 78 of the transmitting device 50.

The receiving device compares the value of the counted number of "1's" to the value of the width of the receiving device's transmitter and writes the minimum of these two values to the LinkWidthIn and LinkWidthOut fields of its Link Config 0 and Link Config 1 registers. Thus, as a result of a cold low-level initialization, the values written to the Link Config registers correspond to the minimum width of the transmitter and receiver widths of the devices at the two ends of the link 60.

Similarly, the device 50 counts the number of "1's" received at its receiver 78, compares this value to the width of its transmitter 82, and writes the minimum of the compared values to its LinkWidthIn and LinkWidthOut fields in the Link Config registers. Because these values correspond to the minimum of the width of the receiver 78, the transmitter 82, and the receiver and transmitter of the device at the other end of the link 60, the values written to the LinkWidthIn and LinkWidthOut fields in the Link Config registers of the devices at the two ends of link 60 are the same as a result of the cold low-level initialization. Thus, communication on the link 60 is enabled in both directions.

A similar procedure may be performed on link 68 and on all other point-to-point links in the system. Because the cold low-level initialization procedure results in values on the LinkWidthIn and LinkWidthOut registers to be the same for the devices at the two ends of a link, links that are wider in one direction than the other may not be fully utilized after a cold reset. Thus, a further link width determination procedure which determines the maximum compatible width in each direction subsequently may be performed, as will be described below. The LinkWidthIn and LinkWidthOut registers may be rewritten with the new values resulting from this subsequent procedure. These new values do not take effect, however, until low-level initialization is repeated following a warm reset.

Once communication parameters are established by the low-level initialization of the links after either the cold or warm reset, the devices can communicate in both directions and further initialization of the system 10 may proceed. After completion of either the cold or warm low-level initialization, each device may transmit a buffer-release message to a receiving device at the end of each point-to-point link implemented by the device (block 106). The message informs the receiving device of the number of buffers the transmitting device has available for receiving packets from that device. Thus, the device receiving the buffer-release message can maintain a count of the number of packets that may be transmitted to the other device.

At block 108 in FIG. 9, the initialization of system 10 further includes a procedure for electing or locating a bootstrap processor to initialize the system 10 and for locating the boot ROM which stores the software code for completing the initialization procedure. In the system illustrated in FIG. 3, the processing subsystem 12 includes a plurality of processing devices 32A–E, each of which includes a processor which may attempt to access the boot ROM when the system 10 is subjected to a cold reset. In such a multi-processor system, one of the processing devices 32A–E is designated as the bootstrap processor (BSP) 110 and is given the responsibility for completing initialization of the computing system.

Designation of the BSP 110 may be performed in any appropriate manner. In an exemplary embodiment of a distributed multi-processor system, the processing device 32A–E which owns the BSP 110 is a device having direct access to a bridge connected to the chain having the boot ROM. For example, in the system illustrated in FIG. 3, the processing devices 32A and 32E have local bridges 46 and 42 which are connected to the I/O chain having the boot ROM 48. Thus, either the processing device 32A or the processing device 32E could own the BSP 110. In one embodiment, ownership of the BSP 110 can be pre-designated by configuring the device 32A or 32E in a manner that establishes ownership (e.g., by hardwiring an appropriate pin in the designated processing device).

Alternatively, in an embodiment in which more than one bridge has direct access to the chain having the boot ROM (e.g., a double-ended chain with both ends in the same processing subsystem, a chain connected to bridges in two separate processing subsystems, etc.), the BSP 110 may be elected by virtue of being the first processing device to receive a response acknowledging successful location of the boot ROM. In such an embodiment, all processing devices will attempt to access the boot ROM during the initialization. Because the fabric of the processing subsystem has not yet been established, each processing device may only attempt to reach the boot ROM through a bridge that is directly accessible to that processing device. Thus, multiple requests (e.g., one request from each end of a double-ended chain) may reach the I/O device having the boot ROM. To support election of the BSP 110 in this manner, the I/O device having the boot ROM is configured to respond to the first request received from a processing device and to note the direction from which the first request was received. Once the I/O device has issued the response, the I/O device responds only to those requests which are received from the same direction in which the first request was received. In alternative embodiments, the I/O device may be configured to respond only to subsequent requests that are received from the source of the first request if such information is included in a request packet. Access requests that are transmitted to an I/O chain that does not include the boot ROM will receive either no response or an error response. Thus, in such an embodiment, only one processing device 32 in the processing subsystem will receive a response acknowledging location of the boot ROM 48. This processing device (e.g., the processing device 32E) then is designated as owning the BSP 110. All other processing devices will be stalled, as they will not have received a response to their request to access the boot ROM.

In one embodiment, a processor in a second processing device (e.g., the processing device 32A), also having direct access to a bridge (e.g., the bridge device 46) connected to the chain having the boot ROM 48, may be designated as a backup BSP. Designation of the backup BSP may be established by configuring (e.g., hardwiring) the processing device in an appropriate manner. The processing device designated as the backup BSP also may include a timer (not shown) implemented in software, for example, which is set when the system is taken through a cold reset. The timer will expire in the worst case amount of time needed to initialize the system. If the timer expires and system initialization has not been completed (as indicated by the fact that the backup BSP has not been initialized by the BSP 110), then the backup BSP will assume the role of the BSP 110, take the system through a warm reset, attempt to locate the boot ROM 48, and execute the initialization procedure.

Alternatively, in an embodiment in which the BSP 110 is elected by virtue of being the first to receive a response from the boot ROM 48, the I/O device having the boot ROM may implement the timer. In such an embodiment, upon expiration of the timer, the I/O device responds to any request that previously had been stalled and then continues to respond to requests which either are received from the same direction or, alternatively, from the same source. Upon receipt of the response from the I/O device having the boot ROM 48, the second processing device assumes the role of the BSP, takes the system through a warm reset, and executes the initialization procedure.

With reference to the embodiment illustrated in FIG. 3, to find the boot ROM 48, the BSP 110 transmits a request that reaches the locally accessible bridge 42. The processing logic in the bridge device 42 is configured to examine the address included in the request packet and to route the request accordingly. However, because the system is not yet initialized, address ranges have not been allocated to the devices in the I/O subsystem 14, and thus it appears as if the request packet is not directed to any device. In the exemplary embodiment, the processing logic in the bridge device 42 is configured to forward all packets with an address in the unknown range down the chain associated with that bridge device. However, because the address is an unknown address, the bridge device 42 sets a bit in the packet indicating that the packet is intended for a default device (i.e., the device having the boot ROM). If the default device is located on the chain, then the default device accepts the packet and acknowledges receipt back to the bridge device. The bridge device may then set a bit in an appropriate register to indicate that it is the bridge which owns the boot ROM. In the exemplary embodiment illustrated in FIG. 3, the I/O device 40B is the default device which contains the boot ROM 48, and either the bridge device 42 or 46 may be the bridge which owns the boot ROM 48.

In an embodiment in which all processing devices attempt to locate the boot ROM, each bridge device may receive a request for access to the boot ROM which includes an address in the known range. As discussed above, each bridge device will set a bit in the packet indicating that the packet is intended for the default device and forward the packet down the associated chain. If the default device is not located on the chain, a response will not be received and the request will time out, or, alternatively, an error message may be generated indicating that this particular bridge device does not own the boot ROM.

Figure 10:
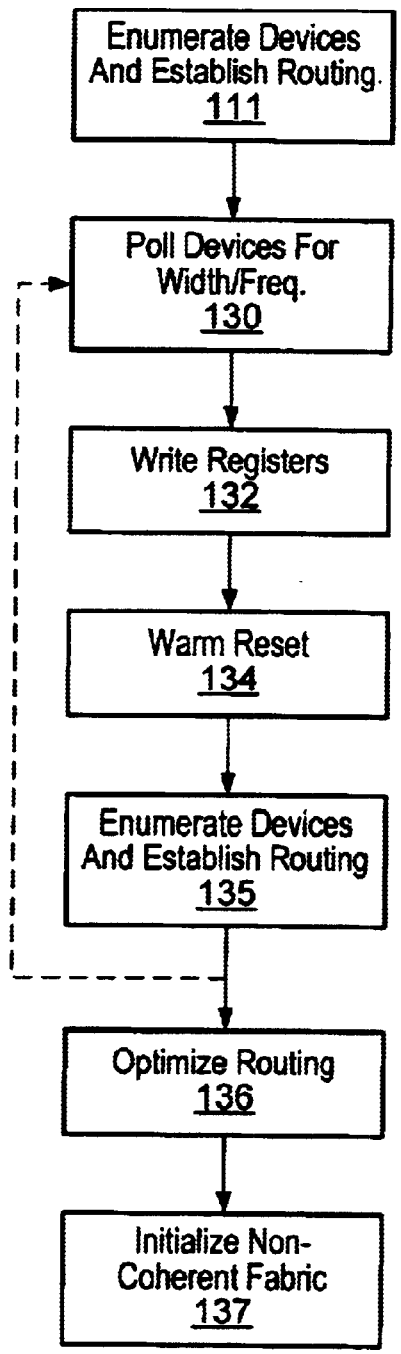
FIG. 10 is a flowchart illustrating an exemplary initialization scheme for the coherent fabric and the communication links of the processing subsystem of FIG. 3, in accordance with the invention.
Figure 12:
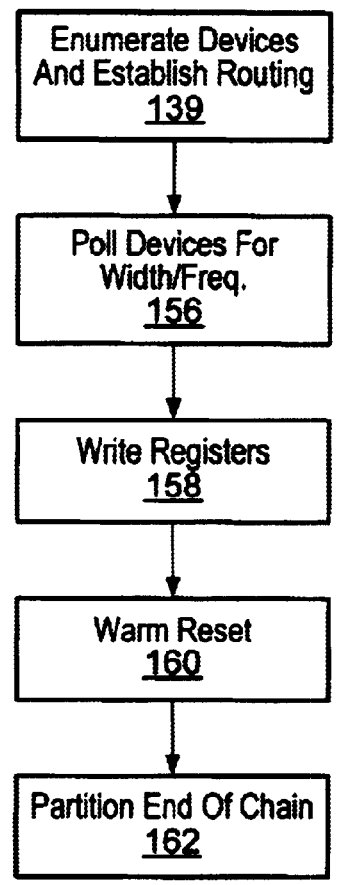
FIG. 12 is a flowchart illustrating an exemplary initialization scheme for the non-coherent fabric and the communication links of the I/O subsystem of FIGS. 2 and 3, in accordance with the invention.

Having found the boot ROM 48, the BSP 110 executes the initialization code stored in the boot ROM 48 to initialize the fabrics of the processing subsystem 12 and the I/O subsystem 14 (block 112 of FIG. 9). A flow chart illustrating the initialization procedure for establishing the coherent fabric of the processing subsystem 12, combined with the link initialization procedure, is illustrated in FIG. 10. Similarly, a flow chart illustrating the initialization procedure for establishing the non-coherent fabric of the I/O subsystem 14, combined with the link initialization procedure, is shown in FIG. 12. It should be understood that the particular order of the blocks shown in the flow charts of FIGS. 10 and 12 may vary and that additional or substitute blocks may be included and certain other blocks omitted during the initialization of the links and fabrics of any particular computing system.

Figure 11A:
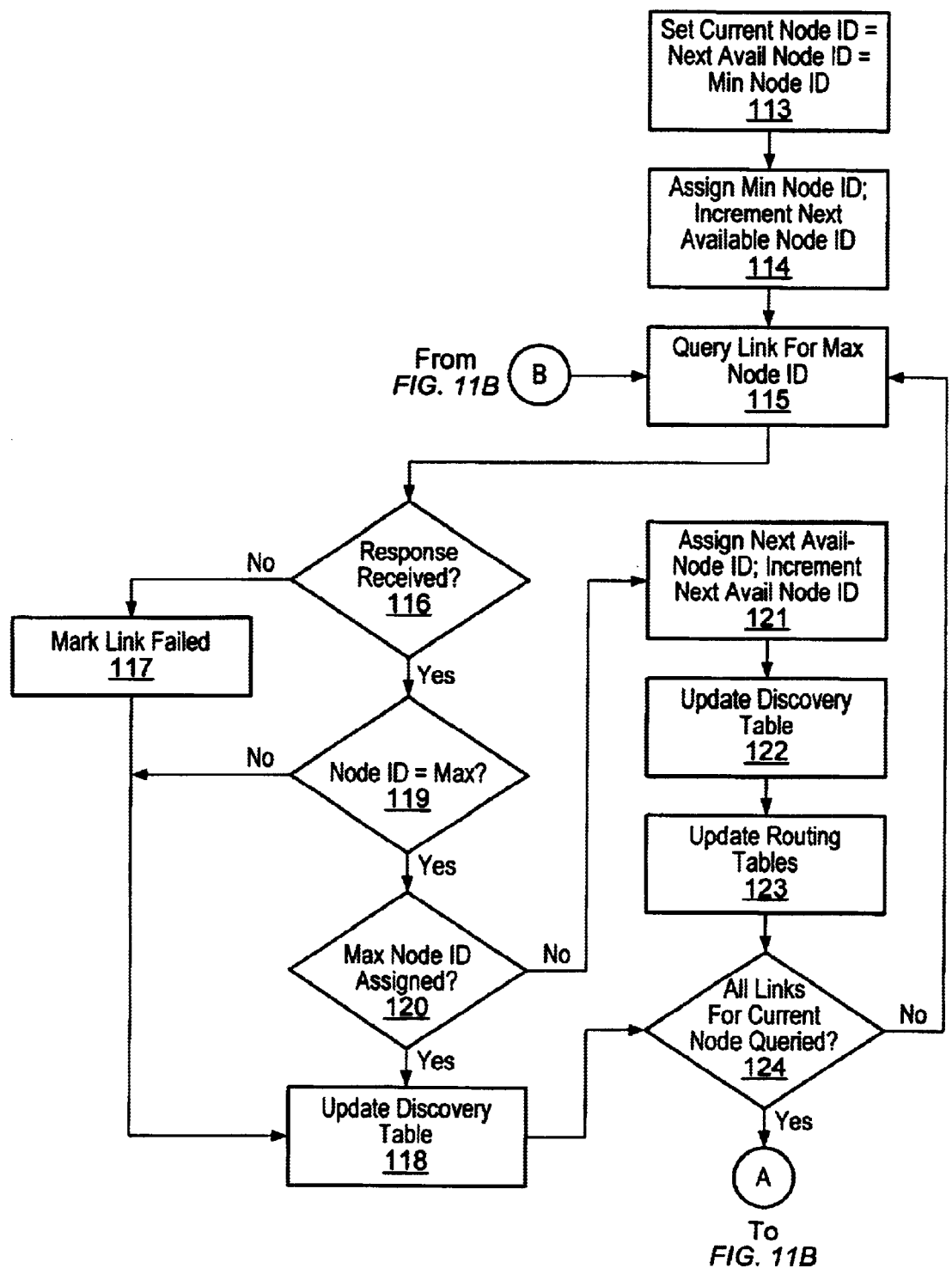
FIGS. 11A and 11B illustrate a flowchart of an exemplary scheme for identifying each device and establishing routing directions for each device to establish the coherent fabric of a processing subsystem in accordance with the flowchart of FIG. 10.
Figure 11B:
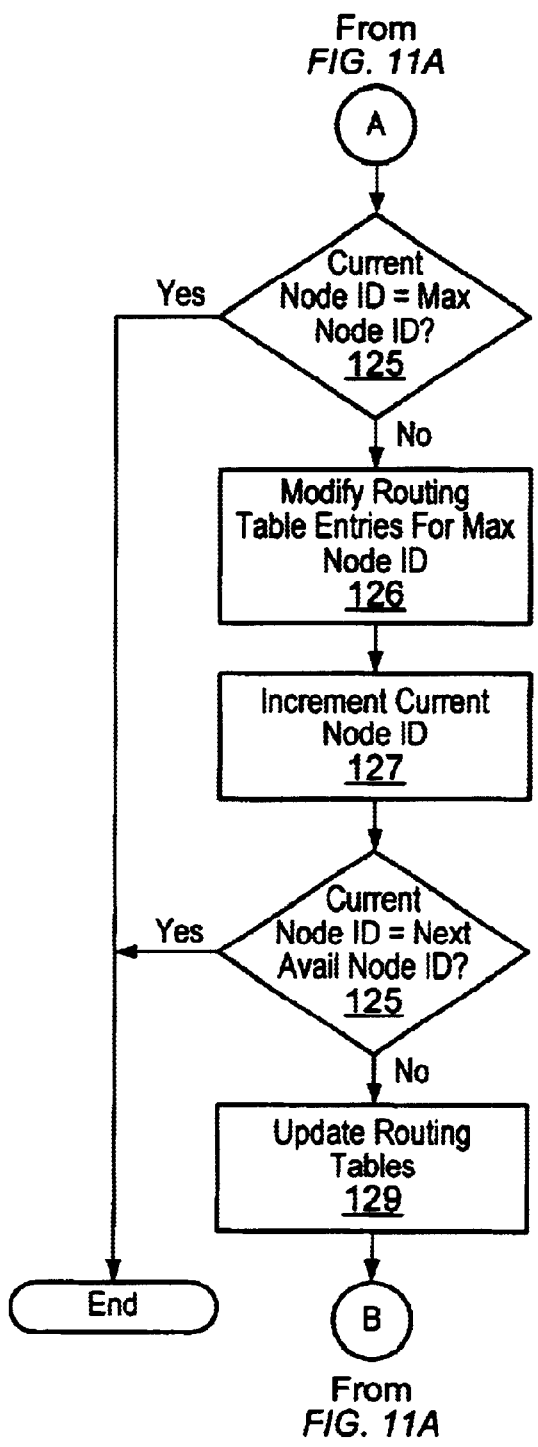

With reference to FIG. 10, and with respect to the coherent fabric of the processing subsystem 12, the BSP 110 executes code which assigns an identifier to each of the processing devices in the processing subsystem 12 and establishes routing directions to transmit communications among the various processing devices (block 111). A flow chart illustrating an exemplary procedure for identifying the processing devices and establishing routing directions for the processing subsystem 12 to establish the coherent fabric is illustrated in FIGS. 11A and 11B. After a cold reset, each of the processing devices 32A–E has the same default identifier or node ID in its node ID register. In an exemplary embodiment, the default node ID is the maximum value node ID that may be assigned to a processing device. For example, packets used to transmit communications in the computing system may include a 3-bit field for identifying the source or destination (i.e., the node ID) of the packet. Thus, the maximum node ID value that may be written to the 3-bit field is "7."

Further, after cold reset, all routing tables in the devices 32A–E also are set to default values. As discussed above, because packets travelling in the processing subsystem may take different paths to reach a destination, the initialization procedure includes the definition of routing tables for each processing device 32A–E which specifies routing for a particular packet. In one embodiment, the routing tables of each device include (1) directed request and response routing tables which, at cold reset, are filled with entries corresponding to that device (i.e., self entries), and (2) broadcast routing tables which, at cold reset, are filled with zeros. The self entries in the request and response routing tables ensure that the device will accept a directed request or response during the initialization procedure. The self entries in the directed request routing tables are filled with new values on the fly during the initialization procedure described below, and then optimized. In one embodiment, new entries also may be placed in the directed response routing tables on the fly during the initialization procedure.

In the embodiment described below, however, during the initialization procedure, responses are not routed based on the contents of the response routing tables. Instead, responses generated by a device automatically are routed out the link on which that device received the most recent request. Such routing of responses may be implemented by disabling the response routing table on cold reset, and causing responses to be routed in accordance with the contents of a "default link" register. In such an embodiment, the device may be configured such that the default link register includes a bit corresponding to each link implemented by that device. Alternatively, a link number corresponding to one of the links implemented by the device may be written to the default link register. Upon receipt of each request, the contents of the default link register automatically are updated to indicate the link on which the request was received. Thus, if the response routing tables have been disabled, responses will be routed out the link indicated by the default link registers, enabling responses from the devices to reach the BSP 110 during intialization. The response routing tables later may be filled with routing entries determined as a result of the initialization procedure and enabled, for example, by writing an appropriate bit. Similarly, the broadcast routing table entries may not be entered during initialization, but determined as a result of the initialization procedure.

In an exemplary embodiment, when executing the initialization procedure, a timer may be implemented for each request issued on a link. Thus, if a response to a request is not received before the timer expires, then the BSP 110 notes the error and proceeds with the initialization procedure.

The BSP 110 begins the initialization procedure at the processing device which owns the BSP 110 (i.e., the processing device 32E). This procedure includes assigning a node ID (e.g., writing the value of the node ID to a node ID register in the device) to the processing device which owns the BSP 110 (block 114 of FIG. 11A) and querying all of the outgoing links implemented by each device to discover other devices. In the exemplary embodiment, determination of the appropriate node ID value to assign to a device is implemented by maintaining values for a "current" node ID and a "next available" node ID. Initially, the values of the current node ID and the next available node ID are set to the same value, which, in the exemplary embodiment, is the minimum value that may be assigned (i.e., "0") (block 113). The current node ID is the node ID that has been assigned to the current device for which the BSP 110 is querying outgoing links. The next available node ID is the node ID which is assigned to the next uninitialized device found by the BSP 110 when querying the outgoing links of the current device.

When the node ID is assigned to the device owning the BSP 110, the value of the next available node ID is incremented. When all links implemented by the current device have been queried, then the value of the current node ID is incremented. Thus, if the incremented value of the current node ID is equal to the value of the next available node ID, then the BSP 110 knows that the initialization procedure is complete. Further, if the value of the current node ID prior to incrementing is equal to the maximum value of node ID that may be assigned (e.g., "7"), then the BSP 110 knows that the initialization procedure is complete.

In the exemplary embodiment, the BSP 110 maintains a discovery table in a memory that is directly accessible to the BSP 110, such as the memory 34E connected to the processing device 32E in FIG. 3. The table is used to keep track of the connections between devices in the processing subsystem as they are discovered by the BSP 110 during the initialization procedure. For example, the discovery table may include an entry for every outgoing link for every processing device found by the BSP 110, thus indicating the device to which each link is connected. At the beginning of the initialization procedure, the discovery table is empty.

Having assigned the current node ID (i.e., "0") to the device owning the BSP 110, the BSP 110 then determines the number of non-failed links implemented by the current node. The non-failed links may be determined, for example, by examining a control and status register (CSR) which contains link failure information obtained during the low-level initialization of the links after reset. Then, one link at a time for each non-failed link that is not currently listed in the discovery table, the BSP 110 sets the directed request routing table entry in the current device to cause requests directed to the default (or maximum) node ID (e.g., "7") to be routed out the link currently being queried. The BSP 110 then generates a request to read the node ID register of the device having the default node ID, which is routed out the current link being queried (block 115). Because the routing tables in all devices have self entries for the default node ID, the device at the other end of the queried link will respond, if reachable. Further, the queried device knows how to route the response back to the BSP 110, because the device has been configured to route responses out on the link on which the last request (e.g., the query from the BSP 110) was received.

If the BSP 110 does not receive a response (block 116) to the request, then the device or the link to that device is dead. The BSP 110 marks the link as failed (block 117) and updates the discovery table accordingly (block 118). If the BSP 110 receives a response (block 116), then the device at the end of the queried link is alive and reachable. If the response from the queried device returns the default (or maximum) node ID (e.g., "7") (block 119) and the default node ID previously has not been assigned (block 120), then the queried device has not been previously touched by the initialization process. If the device is reachable but has been previously touched by the initialization process, its node ID register will have the value of an assigned node ID, and, thus, the queried device may return a value other than the default value, if the default value was not assigned to the queried device.

If the BSP 110 receives a response indicating that the queried device has not previously been visited, then the BSP 110 will write the next available node ID to the device's node ID register and increment the value of the next available node ID (block 121). Then, regardless of Whether or not the response indicates that the device was previously touched, the BSP 110 notes that the queried link is alive and updates the discovery table to indicate that the queried link connects the current device to the node ID of the device at the other end of the link (blocks 118 and 122). The BSP 110 then updates the routing table entries, for the node ID just assigned to the queried device, in each device in the path from the BSP 110 through the current device, to indicate the appropriate link on which to reach the queried device (block 123). Thus, the new entries in the directed routing tables allow directed requests issued by the BSP 110 to the node ID assigned to the queried device to reach the queried device.

If, however, the read response indicates that the queried device previously was touched in the initialization procedure (i.e., the response returned a node ID other than the default node ID, or the default node ID previously had been assigned), then no modification to the routing tables in the devices in the path between the BSP 110 and the current device is performed, because a different path to that device has been previously established.

The BSP 110 then determines whether all links for the current device have been queried (block 124) (e.g., by determining whether all links for the current device have entries in the discovery table). If not, then the BSP 110 sets the directed routing table in the current node to route requests directed to the default node ID out the next link, and repeats the procedure set forth in blocks 115–123. Once all links for the current device have been queried, and if the node ID of the current device is not the same as the default node ID (block 125), then the BSP 110 changes the routing table entries for the default node ID in all the devices in the path from the BSP to the current device to "self" (block 126).

If the current device has been assigned the default node ID, then the BSP 110 does not modify the routing table entries, because the routing table entries for the default node ID already point to the current device. Further, if the current device has been assigned the default node ID, then the BSP 110 knows that initialization is complete after all links for the current device have been queried (END).

If the value of the current node ID is not equal to the value of the default (maximum) node ID, then the BSP 110 increments the value of the current node ID (block 127) and compares the incremented value to the value of the next available node ID. If these values are equal (block 127), then all processing devices have been found and all outgoing links have been queried by the BSP 110 (END). If the values are not equal, however, then the BSP 110 sets the directed request routing table entries for the default node ID in all devices in the path from the BSP 110 to the new current node ID to point to the next device in the path (block 129). Thus, requests from the BSP 110 that are directed to the default node ID will reach the new current device. The BSP 110 then queries each outgoing link of the new current device and repeats the procedure from block 115 in FIG. 11.

In the embodiment described, it is noted that once the default node ID (e.g., the maximum node ID) is assigned to a processing device, then all devices have been found. However, the initialization procedure continues as indicated at blocks 120, 118, and 124–128 until all links have been queried. Responses received from such queries are used to update the link connection information in the discovery table as indicated at block 118.

When all devices have been assigned a node ID and all links have been queried, a breadth-first spanning tree having node ID "0" at the root has been constructed in accordance with the information in the discovery table. The entries in the request routing tables in each processing device are sufficient such that each processing device knows how to route requests to each node ID downstream of that processing device's node ID in the spanning tree. Thus, the BSP 110 can transmit request packets to all other devices in the processing subsystem 12. Further, the BSP 110 now is aware of which links on all devices are alive and to which other device each link connects. At this point in the procedure, any responses to requests from the BSP 110 will be routed back to the BSP 110 along the same path on which the corresponding request was received.

Once routing has been established, communications can be transmitted between the BSP 110 and all the devices in the processing subsystem 12. As a result, the BSP 110 may complete initialization of the communication links by querying each of the devices to determine and establish more optimal communication parameters (e.g., transmitter and receiver frequencies and widths) for the transmitter/receiver pairs at the ends of each unidirectional point-to-point link (block 130 in FIG. 10). In an exemplary embodiment, communication parameters are established by determining the maximum compatible frequency and width of the transmitter/receiver pairs at the ends of each unidirectional link.

For example, with reference to the device 50 illustrated in FIG. 5, to determine the maximum compatible frequency for the transmitter/receiver pair on each uni-directional link 62, 64, 70, and 72, the BSP 110 queries device 50 and each device at the other end of each uni-directional point-to-point link to determine the receiver frequency of those devices. The receiver frequency may be stored in appropriate registers in each device. The BSP 110 may then set the transmit frequency of the transmitters 82 and 84 in the device 50 to the receiver frequencies of the devices at the other ends of links 64 and 72, respectively. For example, the BSP 110 may write values corresponding to the determined frequencies in the Link Freq 0 and Link Freq 1 registers of device 50, respectively. Similarly, the BSP 110 may write values corresponding to the receiver 78 and 80 frequencies in corresponding transmitter frequency registers in the devices at the other ends of unidirectional links 62 and 70, respectively (block 132).

To determine the maximum compatible link width, the BSP 110 may query device 50 and the devices on the other ends of links 60 and 68 to access the MaxLinkWidthIn and MaxLinkWidthOut fields in the Link Config registers in the capability block of those devices. The BSP 110 may write the polled values to the LinkWidthOut and LinkWidthIn fields in the Link Config 0 and Link Config 1 registers in the device 50 and the devices at the other ends of links 60 and 68, thus matching the widths of the transmitter and receiver at the ends of each link (block 132).

Once the maximum transmitter frequencies and the maximum utilized transmitter and receiver widths have been determined and written to the Link Freq and Link Config registers, the computing system 10 may be taken through a "warm reset" such that the new link frequencies and link widths may take effect (block 134). As discussed above, a warm reset may be initiated by software or firmware at any time, or multiple times, during the initialization procedure, and differs from the "cold" reset sequence in that the frequencies and widths that have been written to the Link Freq and Link Config registers are preserved rather than cleared. As a result of a warm reset, the devices repeat the low-level link initialization described above, but now operate using the new communication parameters which correspond to the values written to the devices' registers by the BSP 110.

To ensure proper operation of the fabric as defined, the BSP 110 may repeat the fabric initialization algorithm shown in FIGS. 11A and 11B with the new link widths and frequencies. Repetition of the sizing algorithm with the new link widths and frequencies may uncover any link or device failures that may have occurred due to the changes in the link communication parameters. If necessary (e.g., the BSP 110 has found a failed link or device), the BSP 110 may repeat the link frequency and width determinations and set new communication parameters for a failed link. Further iterations of the initialization procedure to establish an integrated, operational fabric may be performed, as desired.

Each iteration of the fabric initialization algorithm results in the establishment of routing tables in the processing devices and the construction of a spanning tree. The routing tables and spanning tree, however, may not establish the most efficient route by which to route packets among the various devices. Thus, the BSP 110 may execute an appropriate optimization algorithm to calculate more efficient routing directions (block 136). The routing tables in the devices then may be reloaded with the values resulting from the optimization calculation (block 128).

At this time, the response routing tables may also be enabled and filled with entries as a result of the routing optimization. Similarly, entries for the broadcast routing tables also may be determined and the broadcast tables filled.

Upon completion of the initialization of the fabric of the processing subsystem 12, the BSP 110 allows the other processing devices to access the boot ROM, as desired, and allows other devices in the computing system 10 to respond to requests from such other processing devices. For example, the BSP 110 may set an appropriate bit in each of the processing devices. Initialization of the fabric of the I/O subsystem 14 then proceeds (block 137).

To initialize the fabric of the I/O subsystem 14, the BSP 110 may poll each I/O device through the respective master bridge devices associated with each chain. A bridge device may be designated as the master by any appropriate procedure, such as by setting a bit in a register implemented in either hardware or software, or the BSP 110 may designate one of the bridges as the master in an arbitrary manner. In a double-ended chain, the bridge at one end of the chain is the master, while the bridge device at the other end of the chain is designated as the slave. In the system illustrated in FIG. 3, the bridge device 16 is the master of the chain which includes the I/O devices 28A, 28B, and 28C. Similarly, the bridge device 42 is designated the master and the bridge device 46 is designated the slave for the chain which includes the I/O devices 40A and 40B.

Figure 13:
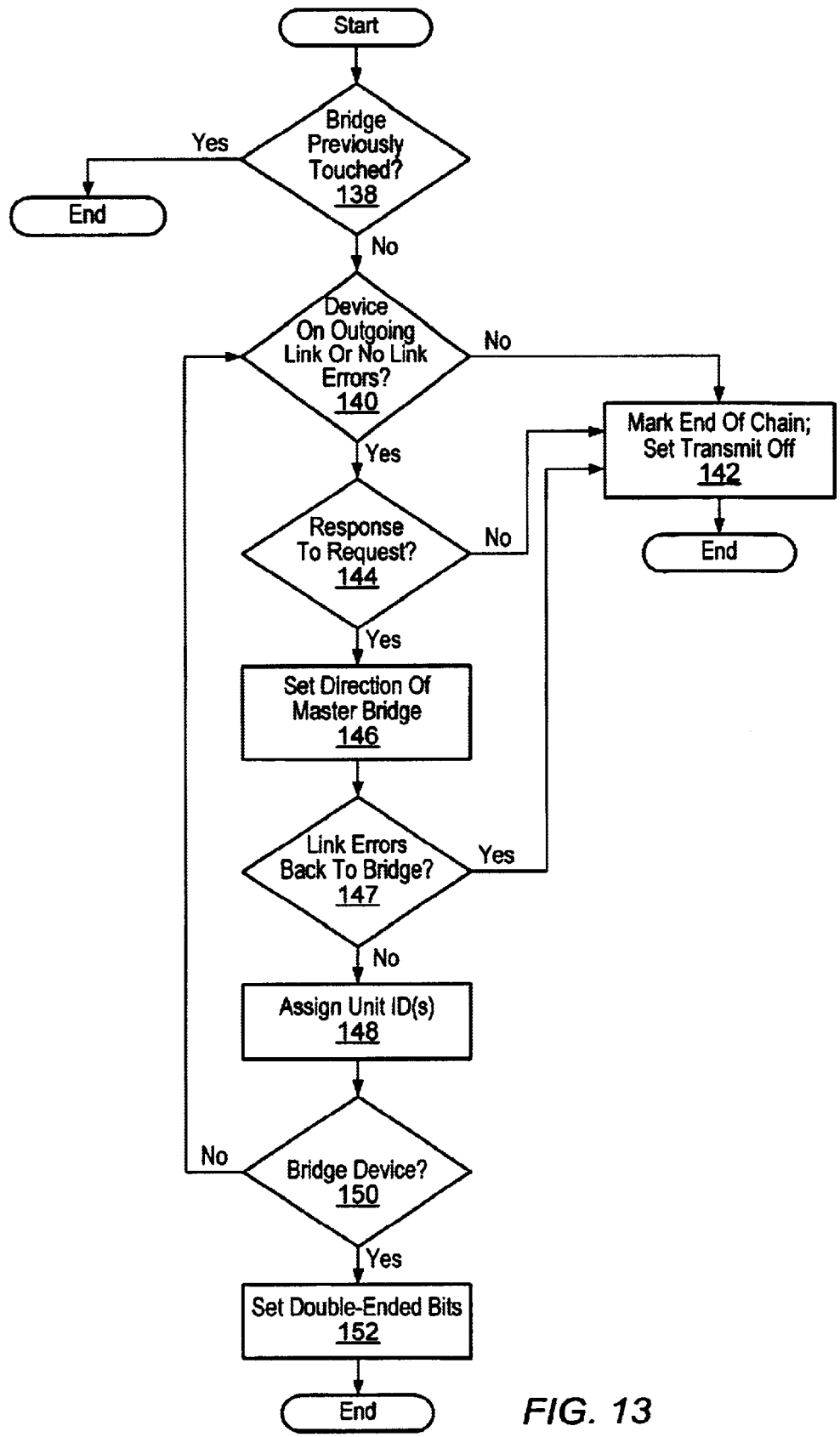
FIG. 13 is a flowchart illustrating an exemplary scheme for identifying each device and establishing routing directions for each device to establish the non-coherent fabric for a daisy-chained I/O subsystem in accordance with the flowchart of FIG. 12.

FIGS. 12 and 13 illustrate flowcharts of an exemplary algorithm that may be executed to establish the fabric of the I/O subsystem 14. It should be understood, however, that the particular order of the blocks shown in the flowcharts may vary and that different blocks or additional blocks may be performed and certain blocks omitted during the initialization of any particular computing system.

With reference to FIG. 12, to establish the fabric of the I/O subsystem 14, the BSP 110 executes an initialization algorithm to determine the size of each chain, provide an identifier to each of the I/O devices, and establish routing directions to route communications between the I/O devices in each chain and between each chain and the processing subsystem (block 139 of FIG. 12).

In the exemplary embodiment, the BSP 110 begins initialization of the I/O subsystem by executing the algorithm illustrated in FIG. 13 for each bridge device found in the computing system 10. By polling the bridge device, the BSP 110 may determine whether the bridge previously has been touched the I/O initialization process (block 138). For example, the bridge may have been previously found, because it was the second bridge discovered on a chain that the BSP 110 previously initialized. In such event, the BSP 110 will have set a Double Ended bit in the bridge device to indicate that the corresponding chain includes two bridges. Thus, if the BSP 110 finds the Double Ended bit set in the polled bridge device, then the BSP 110 knows that the chain behind the polled bridge device already is initialized and takes no further action with respect to the polled bridge (END).

If the bridge device has not previously been touched by the I/O initialization procedure, the BSP 110 may determine whether the outgoing link of the bridge device has taken any errors or whether another device has been detected on the other end (block 140). For example, the BSP 110 may examine information in control registers that was obtained during the low-level link initialization. In the exemplary embodiment, a set bit of the Initialization Complete bit in the Link Control register of the bridge's capability block indicates that a device is connected at the other end of the link. The BSP 110 may also examine the CRC error bits in the bridge's Link Control register to determine whether the outgoing link (i.e., link 26A or 44A) has taken any errors.

If another device is not detected or the link is taking errors, then the End of Chain and Transmit Off bits are set in the Link Control register of the bridge's capability block (block 142) and the procedure for that chain ends (END). If a connected device (e.g., the I/O device 28A or 40A) is detected, however, then the BSP 110, through the bridge device, issues a request on the transmitting link for access to the capability registers of the connected device. The address in the read request is in the configuration range and corresponds to a device having a base unit ID that is the default Base Unit ID assigned to all devices as a result of a cold reset.

In the exemplary embodiment, the default Base Unit ID for the I/O devices corresponds to a minimum Unit ID (e.g., "0"). Thus, the first I/O device (i.e., the I/O device 28A or 40A) on the daisy chain which has not yet been initialized will accept and respond to the read request. In the exemplary embodiment, the BSP 110 then performs a write to the responding I/O device to indicate which link of the device is pointing toward the bridge device (block 146). For example, the BSP 110 may write to the capability registers of the connected I/O device, which causes the Master Host bit to be set for the appropriate link. In the exemplary embodiment, the BSP 110 examines the CRC error bits in the Link Control register of the I/O device to determine if the device is seeing any errors on the link between it and the master bridge (block 147). If the link is taking errors, then the End Of Chain and Transmit Off bits are set on the previous device (block 142) and the procedure for that chain ends (END).

If no errors are indicated, then the BSP 110 writes the Base Unit ID field of the device's command register with the next available unit ID (which, at reset, is set to "1" (i.e., the next value after the value of the default base unit ID)) (block 148). The value of the next available unit ID is then incremented by the value indicated in the Unit Count field in the command register of the I/O device. Once the device is assigned one or more unit IDs, the device will no longer accept or respond to requests having an address that corresponds to the default Base Unit ID (i.e., "0"). If the device is not a bridge (block 150), then the BSP 110 returns to block 140 to query the next link in the chain.

If, during this process, the BSP 110 reaches another bridge device (block 150), then the BSP 110 knows the chain is double-ended and sets the Double Ended bit in the command registers in both the master bridge device (i.e., bridge 42) and the second bridge device (i.e., bridge 46). Setting the Double Ended bit in the second bridge allows the BSP 110 to determine, when later polling the second bridge, whether the chain behind the second bridge has been initialized. If, however, the BSP 110 has found the end of the chain (e.g., no device is detected on the outgoing link, the link is taking CRC errors, etc.) (block 140) without reaching another bridge, then the BSP 110 marks the end of the chain by, for example, setting the End of Chain bit and the Transmit Off bits in the Link Control register corresponding to the last link in the chain (block 142). Sizing and routing for that I/O chain is then complete (END). The BSP 110 then may poll the next bridge device (if any) through the coherent fabric to determine if the next bridge device is connected to an uninitialized I/O chain. If another bridge with an uninitialized chain is found, then the BSP 110 again executes the initialization algorithm shown in FIG. 13.

If, during the initialization of any double-ended I/O chain, a link failure prevents the BSP 110 from finding a second bridge at the end of the chain, the BSP 110 will discover that an error has occurred when the BSP 110 polls the second bridge and finds that the second bridge previously has not been touched (e.g., the Double Ended bit is clear) (block 138). The BSP 110 then will initialize the chain through the second bridge up to the point of the failure in accordance with the procedure set forth in blocks 140 to 146. In such case, two single-ended chains will be established, each chain having a master host bridge, with the second bridge being one of the masters. However, as discussed above, if the BSP 110 polls the second bridge and finds that it previously has been touched (e.g., its Double Ended bit is set) (block 138), then the BSP 110 will not initiate the algorithm for initializing the chain through the second bridge.

In the exemplary embodiment, designation of the master bridge and the slave bridge is arbitrary as the BSP 110 simply successively queries the outgoing link of each bridge device it finds. The first bridge connected to a particular I/O chain that is accessed by the BSP 110 becomes the master bridge by default. If, during the initialization of the chain, the BSP 110 finds a second bridge at the end of the chain, then that bridge becomes the slave bridge by default. As discussed above, a failure may prevent the BSP 110 from finding the second bridge and completing initialization of the entire chain. However, as discussed above, the BSP 110 eventually will query the second bridge and, based on the query, can determine whether the chain behind the second bridge was initialized.

Once sizing and routing has been established for an I/O chain, and in a manner similar to that described above with respect to the processing subsystem 12, the BSP 110 then may continue with the link initialization by polling each I/O device such that maximum compatible communication parameters for the transmitter/receiver pairs at the ends of each unidirectional link may be set (block 156 of FIG. 12). After determining the maximum compatible communication parameters (e.g., transmitter frequency, link widths), the BSP 110 writes the new values to the appropriate Link Freq and Link Config registers in the I/O devices (block 158). The I/O subsystem 14 may then be taken through a warm reset such that the new default communication parameters may take effect (block 160).

In some embodiments, it may be desirable to partition a double-ended chain to distribute the communication load between the two bridges (block 162 in FIG. 12). In such embodiments, an algorithm may be implemented that selects the location for breaking the chain in an optimal manner. The End of Chain and Transmit Off bits for the devices on either side of the break may then be set. Further, the Default Direction bits in the devices on the slave bridge side of the break are set such that those devices will route their requests to the slave bridge rather than the master bridge.

At this point, the fabric for the I/O subsystem 14 has been established, as well as the fabric for the processing subsystem 12, and the communication parameters for each of the point-to-point links have been established. Each fabric can communicate to the other fabric through the bridge device on its side of the break between the two subsystems.

Initialization of the computing system 10 may then proceed in a conventional manner. For example, the host memory may be mapped across the processing devices 32 in the processing subsystem 12, and address ranges may be assigned to the various chains and I/O devices in the I/O subsystem 14.

It should be understood that the initialization scheme described above may be performed in many different manners and may be implemented in software, hardware, or a combination of software and hardware. Further, code or instructions representing the initialization scheme or portions of the initialization scheme may be embodied in any type of tangible medium, such as a memory device (e.g., a hard disk, floppy disk, CD ROM, integrated circuit memory, etc.), an application specific integrated circuit ("ASIC"), a programmable logic array ("PLA") or device ("PLD"), etc. Still further, while the initialization scheme has been described with respect to a computing system in which both the processing subsystem and the I/O subsystem implement point-to-point links, the initialization scheme described above may be performed solely to initialize a point-to-point link processing subsystem or solely to initialize a point-to-point link I/O subsystem.

Still further, the initialization scheme is intended to apply to a computing system having a single processing subsystem connected to multiple I/O subsystems or to a computing system having multiple processing subsystems connected to a single I/O subsystem. In other words, the fabric and link initialization schemes are intended to apply to any type of system having devices interconnected by point-to-point links such that an integrated communication fabric and optimum link communication parameters may be established.

It should further be understood that the various portions of the initialization scheme described above may be performed in a different order and certain portions may be omitted entirely. For example, establishment of coherent and non-coherent fabrics may be performed in the manner described above regardless of the specific manner in which communication between pairs of devices connected to the ends of point-to-point links is enabled. Moreover, communication between pairs of devices interconnected by a point-to-point link may be implemented in the manner described above regardless of the specific manner in which the coherent and noncoherent fabrics are established. Thus, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of initializing a computing system having a plurality of devices connected to a communication link, the communication link comprising a plurality of point-to-point links, each of the plurality of point-to-point links interconnecting a respective pair of devices of the plurality of devices, the method comprising the acts of:

configuring a first device and a second device of the plurality of devices to communicate on the communication link using common communication parameters, the first device connected to a first end of a first point-to-point link, and the second device connected to a second end of the first point-to-point link;

transmitting a communication on the communication link to each of the first device and the second device;

determining, based on the communication, maximum compatible communication parameters of the first and second devices for communications on the first point-to-point link; and if the maximum compatible communication parameters differ from the common communication parameters, reconfiguring the first device and/or the second device to communicate on the first point-to-point link using the maximum compatible communication parameters.

2. The method as recited in claim 1, wherein the common communication parameters comprise a common communication frequency.

3. The method as recited in claim 1, wherein the common communication parameters comprise a common link width.

4. The method as recited in claim 1, wherein the act of determining the maximum compatible communication parameters comprises the act of determining a maximum compatible link width of the first and second devices for communications on the first point-to-point link.

5. The method as recited in claim 4, wherein the first point-to-point link comprises a first unidirectional link directed from the first device to the second device, and a second unidirectional link directed from the second device to the first device, and the act of determining the maximum compatible link width of the first and second devices on the first point-to-point link comprises the acts of:

determining a first maximum compatible link width of the first and second devices for communications on the first unidirectional link; and determining a second maximum compatible link width of the first and second device for communications on the second unidirectional link.

6. The method as recited in claim 1, wherein the act of determining the maximum communication parameters comprises the act of determining a maximum compatible communication frequency of the first and second devices for communications on the first point-to-point link.

7. The method as recited in claim 6, wherein the first point-to-point link comprises a first unidirectional link directed from the first device to the second device, and a second unidirectional link directed from the second device to the first device, and the act of determining the maximum compatible communication frequency of the first and second devices on the first point-to-point link comprises the acts of:

determining a first maximum compatible transmit frequency for transmitting communications from the first device to the second device on the first unidirectional link; and determining a second maximum compatible transmit frequency for transmitting communications from the second device to the first device on the second unidirectional link.

8. The method as recited in claim 1, wherein a communication capability of each device is stored in at least one capability register in the respective device, and wherein transmitting the communication to the first device and the second device comprises the act of transmitting a request to read the at least one capability register in each of the first device and the second device.

9. The method as recited in claim 1, comprising:

assigning an identifier to each device of the plurality of devices; and defining routing directions for routing communications to the plurality of devices on the plurality of point-to-point links.

10. The method as recited in claim 9, wherein a first portion of the plurality of devices comprises a plurality of processing devices, and wherein defining routing directions comprises the act of defining a routing table in each of the plurality of processing devices for routing communications to each of the other processing devices of the plurality of processing devices.

11. The method as recited in claim 9, wherein a first portion of the plurality of devices comprises a plurality of input/output (I/O) devices interconnected in a daisy-chain structure, the daisy-chain structure comprising a first end connected to a bridge device, and wherein defining routing directions comprises the act of establishing at each I/O device of the plurality of I/O devices a direction for routing communications to the bridge device.

12. The method as recited in claim 11, wherein the daisy-chain structure comprises a second end, and the method comprises the act of establishing the second end of the daisy-chain structure.

13. A method for initializing a computing system, the computing system including a processing subsystem and an input/output (I/O) subsystem, the processing subsystem having a plurality of processing devices interconnected by a first plurality of point-to-point links, the I/O subsystem having a plurality of I/O devices interconnected by a second plurality of point-to-point links, each of the first plurality of point-to-point links interconnecting a respective pair of processing devices, and each of the second plurality of point-to-point links interconnecting a respective pair of I/O devices, the method comprising the acts of:

configuring each respective pair of processing devices to communicate on an interconnecting point-to-point link of the first plurality of point-to-point links at a common frequency using a common link width;

configuring each respective pair of I/O devices to communicate on an interconnecting point-to-point link of the second plurality of point-to-point links at an I/O common frequency using an I/O common link width;

transmitting a communication to each of the plurality of processing devices to determine a maximum compatible frequency and a maximum compatible link width corresponding to each respective pair of processing devices;

transmitting a communication to each of the plurality of I/O devices to determine a maximum I/O compatible frequency and a maximum I/O compatible link width corresponding to each respective pair of I/O devices;

if either the maximum compatible frequency or the maximum compatible link width corresponding to a particular respective pair of processing devices is different than the common frequency or the common link width, then reconfiguring the particular respective pair of processing devices to communicate on the interconnecting point-to-point link using the corresponding maximum compatible frequency and/or the corresponding respective maximum compatible link width; and if either the maximum I/O compatible frequency or the maximum I/O compatible link width corresponding to a particular respective pair of I/O devices is different than the I/O common frequency or the I/O common link width, then reconfiguring the particular respective pair of I/O devices to communicate on the interconnecting point-to-point link using the corresponding maximum compatible frequency and/or the corresponding maximum compatible link width.

14. The method as recited in claim 13, wherein the common frequency and the common link width are the same for each respective pair of processing devices.

15. The method as recited in claim 13, wherein the common frequency is the same for each respective pair of processing devices.

16. The method as recited in claim 13, wherein the common frequency and/or the common link width for a first respective pair of processing devices are different than the common frequency and/or the common link width, respectively, for a second respective pair of processing devices.

17. The method as recited in claim 13, wherein the common frequency and the common link width are the same as the I/O common frequency and the I/O common link width, respectively.

18. The method as recited in claim 13, wherein the I/O common frequency and the I/O common link width are the same for each respective pair of I/O devices.

19. The method as recited in claim 13, wherein the I/O common frequency is the same for each respective pair of I/O devices.

20. The method as recited in claim 13, wherein the I/O common frequency and/or the I/O common link width for a first respective pair of I/O devices is different than the I/O common frequency and/or the I/O common link width for a second respective pair of I/O devices.

21. The method as recited in claim 13, wherein a first I/O device of the plurality of I/O devices comprises a boot read-only memory (ROM), and the method comprises the act of:
 transmitting a communication from a first processing device of the plurality of processing devices to locate the boot ROM.

22. The method as recited in claim 21, wherein the communication comprises an unassigned address, and the method comprises the act of:
 configuring the first I/O device to accept any communication comprising an unassigned address.

23. The method as recited in claim 13, comprising the act of assigning an identifier to each of the plurality of processing devices and each of the plurality of I/O devices.

24. The method as recited in claim 13, comprising the act of defining a routing table for each of the plurality of processing devices to route communications to each of the other processing devices of the plurality of processing devices.

25. The method as recited in claim 13, wherein the I/O subsystem is connected to the processing subsystem by a bridge device, and wherein the plurality of I/O devices of the I/O subsystem are interconnected in a daisy-chain structure, the daisy-chain structure comprising a first end connected to the bridge device, the method comprising the act of defining a routing direction for each of the plurality of I/O devices to route communications to the bridge device.

26. A computing system, comprising:
 a communication medium comprising a plurality of point-to-point links;
 a plurality of devices connected to the communication medium, each of the plurality of point-to-point links interconnecting a respective pair of devices of the plurality of devices, each respective pair of devices being configured to communicate on the corresponding interconnecting point-to-point link using common communication parameters;
 a processor configured to communicate with the plurality of devices, wherein the processor is configured to:
  transmit a communication to a first device and a second device of the plurality of devices, the first device being connected to a first end of a first point-to-point link of the plurality of point-to-point links, the second device being connected to a second end of the first point-to-point link,
  determine, based on the communication, maximum compatible communication parameters of the first and second devices for communications on the first point-to-point link; and
  if the maximum compatible communication parameters differ from the common communication parameters, reconfigure the first device and/or the second device to communicate on the first point-to-point link using the maximum compatible communication parameters.

27. The computing system as recited in claim 26, wherein at least one of the common communication parameters for each of the respective pair of devices is the same.

28. The computing system as recited in claim 26, wherein the common communication parameters for a first respective pair of devices is different than the common communication parameters for a second respective pair of devices.

29. The computing system as recited in claim 26, wherein the maximum compatible communication parameters of the first and second devices for communications on the first point-to-point link comprise a maximum compatible link width.

30. The computing system as recited in claim 29, wherein the first point-to-point link comprises a first unidirectional link directed from the first device to the second device, and a second unidirectional link directed from the second device to the first device, and wherein the maximum compatible width for communications on the first point-to-point link comprises a first maximum compatible link width of the first and second devices for communications on the first unidirectional link and a second maximum compatible link width of the first and second devices for communications of the second unidirectional link.

31. The computing system as recited in claim 26, wherein the maximum communication parameters comprise a maximum compatible communication frequency of the first and second devices for communications on the first point-to-point link.

32. The computing system as recited in claim 31, wherein the first point-to-point link comprises a first unidirectional link directed from the first device to the second device, and a second unidirectional link directed from the second device to the first device, and wherein the maximum compatible communication frequency for communications on the first point-to-point link comprises a first maximum compatible transmit frequency for transmitting communications from the first device to the second device on the first unidirectional link, and a second maximum compatible transmit frequency for transmitting communications from the second device to the first device on the second unidirectional link.

33. The computing system as recited in claim 26, wherein the first device is configured to store a first communication capability of the first device for the first point-to-point link, and wherein the second device is configured to store a second communication capability of the second device for the first point-to-point link, and wherein the processor is configured to read the first and second communication capabilities to determine the maximum compatible communication parameters, and to write new values to the first and second devices representative of the maximum compatible communication parameters.

34. A tangible medium for facilitating the initialization of a computing system having a plurality of devices connected to a communication link, the communication link comprising a plurality of point-to-point links, the method comprising the acts of:
 a routine for transmitting a communication to a first device and a second device of the plurality of devices, the first device being connected to a first end of a first point-to-point link of the plurality of point-to-point links, and the second device being connected to a second end of the first point-to-point link, the first and second devices being configured to communicate on the first point-to-point link using common communication parameters;

a routine for determining, based on the communication, maximum compatible communication parameters for the first and second devices for communications on the first point-to-point link; and a routine for reconfiguring the first device and/or the second device to communicate on the first point-to-point link using the maximum compatible communication parameters if the maximum compatible communication parameters differ from the common communication parameters.

35. The tangible medium as recited in claim 34, wherein the tangible medium comprises a memory device.

36. The tangible medium as recited in claim 35, wherein the memory device comprises an integrated circuit memory.

37. The tangible medium as recited in claim 34, wherein the tangible medium comprises an application specific integrated circuit.

38. The tangible medium as recited in claim 34, wherein the tangible medium comprises a programmable logic device.

* * * * *